United States Patent
Rav-Noy et al.

(10) Patent No.: US 9,996,255 B2
(45) Date of Patent: Jun. 12, 2018

(54) TOUCH SCREEN FINGER TRACING DEVICE

(71) Applicant: Capit Learning

(72) Inventors: Eyal Rav-Noy, Los Angeles, CA (US); Tzippy Rav-Noy, Los Angeles, CA (US)

(73) Assignee: CAPIT LEARNING, Los Angeles, CA (US)

( * ) Notice: Subject to any disclaimer, the term of this patent is extended or adjusted under 35 U.S.C. 154(b) by 294 days.

(21) Appl. No.: 15/048,782

(22) Filed: Feb. 19, 2016

(65) Prior Publication Data

US 2016/0246498 A1 Aug. 25, 2016

Related U.S. Application Data

(60) Provisional application No. 62/119,626, filed on Feb. 23, 2015.

(51) Int. Cl.
| | |
|---|---|
| *G06F 3/0488* | (2013.01) |
| *G06F 3/16* | (2006.01) |
| *G06F 3/0484* | (2013.01) |
| *G06F 3/0486* | (2013.01) |
| *G06K 9/00* | (2006.01) |

(52) U.S. Cl.
CPC ........ *G06F 3/04883* (2013.01); *G06F 3/0486* (2013.01); *G06F 3/04842* (2013.01); *G06F 3/04845* (2013.01); *G06F 3/167* (2013.01); *G06K 9/00402* (2013.01)

(58) Field of Classification Search
CPC .................................................. G06F 3/0481
See application file for complete search history.

(56) References Cited

U.S. PATENT DOCUMENTS

| | | |
|---|---|---|
| 5,636,995 A | 6/1997 | Sharpe, III et al. |
| 5,944,533 A | 8/1999 | Wood |
| 6,215,901 B1 | 4/2001 | Schwartz |
| (Continued) | | |

FOREIGN PATENT DOCUMENTS

| | | |
|---|---|---|
| KR | 10-2006-0043877 A | 5/2006 |
| KR | 10-0838343 B1 | 6/2008 |
| KR | 20-2012-0007317 U | 10/2012 |

OTHER PUBLICATIONS

International Search Report—Written Opinion, Application No. PCT/US2016/018778, dated Jun. 17, 2016 by Capit Learning, 10 pages.

*Primary Examiner* — David Choi
(74) *Attorney, Agent, or Firm* — Knobbe, Martens, Olson & Bear LLP

(57) ABSTRACT

A portable electronic device includes a touch display configured to sense contact with a finger or stylus, a speaker, and a processing system that communicates with the touch display and the speaker. The device is configured to display a symbol using a set of trace indicator line segments comprising a trace direction indicator and a trace termination indicator and to highlight a region of a first of the trace indicator line segments. The device is configured to detect user touch input at multiple locations on the touch display and determine whether the first trace indicator line segment has been traced from the highlighted region to the termination indicator in a direction corresponding to the trace direction indicator, and in response, to draw and maintain a color line corresponding to the detected user touch input at the multiple locations.

22 Claims, 38 Drawing Sheets

(56) References Cited

U.S. PATENT DOCUMENTS

| | | |
|---|---|---|
| 2001/0036862 A1 | 11/2001 | Kitamori et al. |
| 2002/0094852 A1 | 7/2002 | Fujioka et al. |
| 2002/0142270 A1 | 10/2002 | Furry |
| 2002/0160342 A1 | 10/2002 | Castro |
| 2003/0030619 A1 | 2/2003 | Martin et al. |
| 2005/0277094 A1 | 12/2005 | Davidson |
| 2006/0110713 A1 | 5/2006 | Guffanti |
| 2007/0003144 A1 | 1/2007 | Landstad |
| 2012/0171656 A1 | 7/2012 | Shen |
| 2012/0299881 A1 | 11/2012 | De Muelenaere et al. |
| 2013/0321314 A1 | 12/2013 | Oh et al. |
| 2014/0019855 A1 | 1/2014 | Kim et al. |
| 2014/0344768 A1 | 11/2014 | Su |
| 2015/0064664 A1 | 3/2015 | Gobuty |
| 2015/0286886 A1 | 10/2015 | Wimmer et al. |
| 2015/0370351 A1 | 12/2015 | Wu et al. |

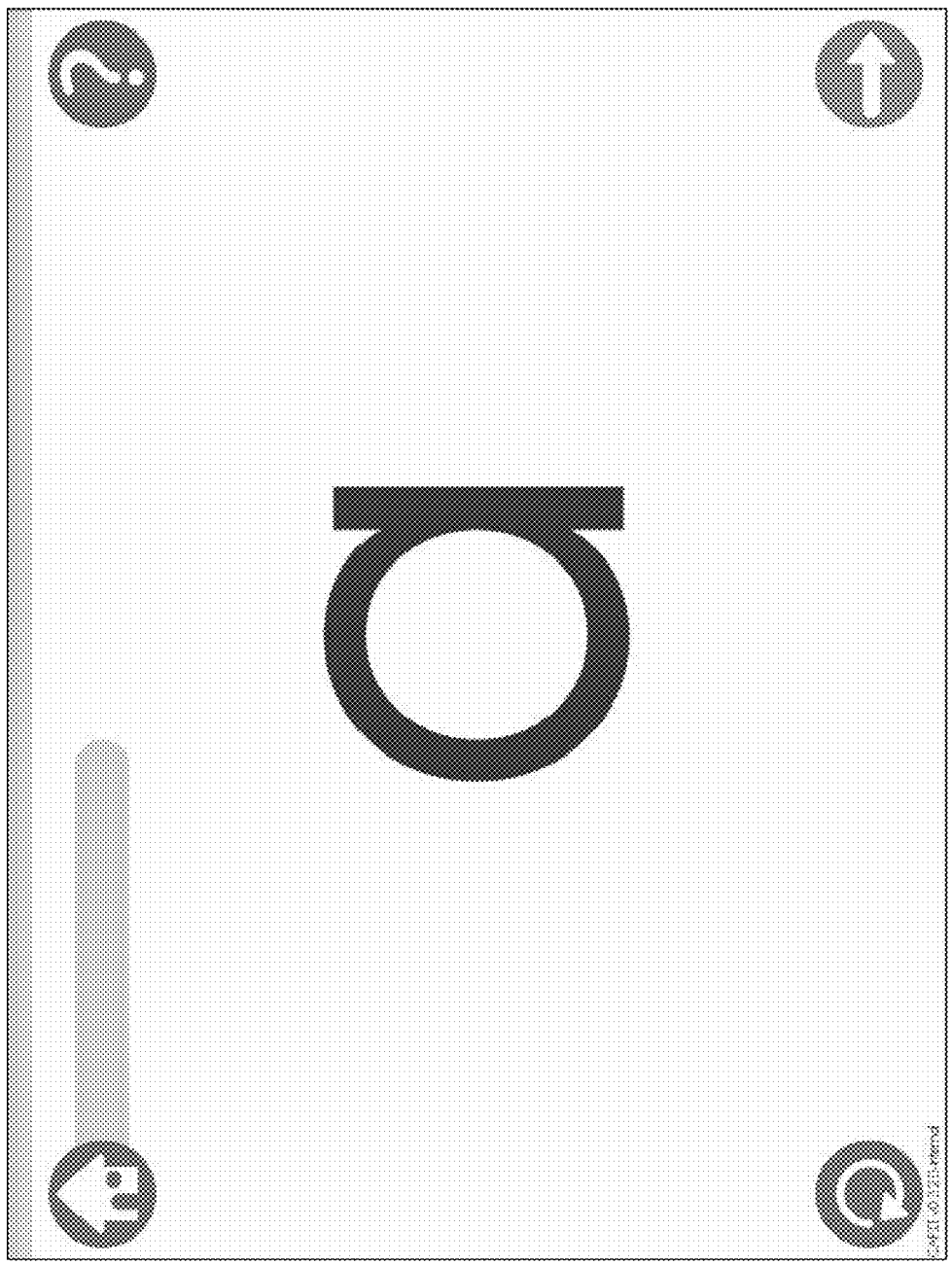

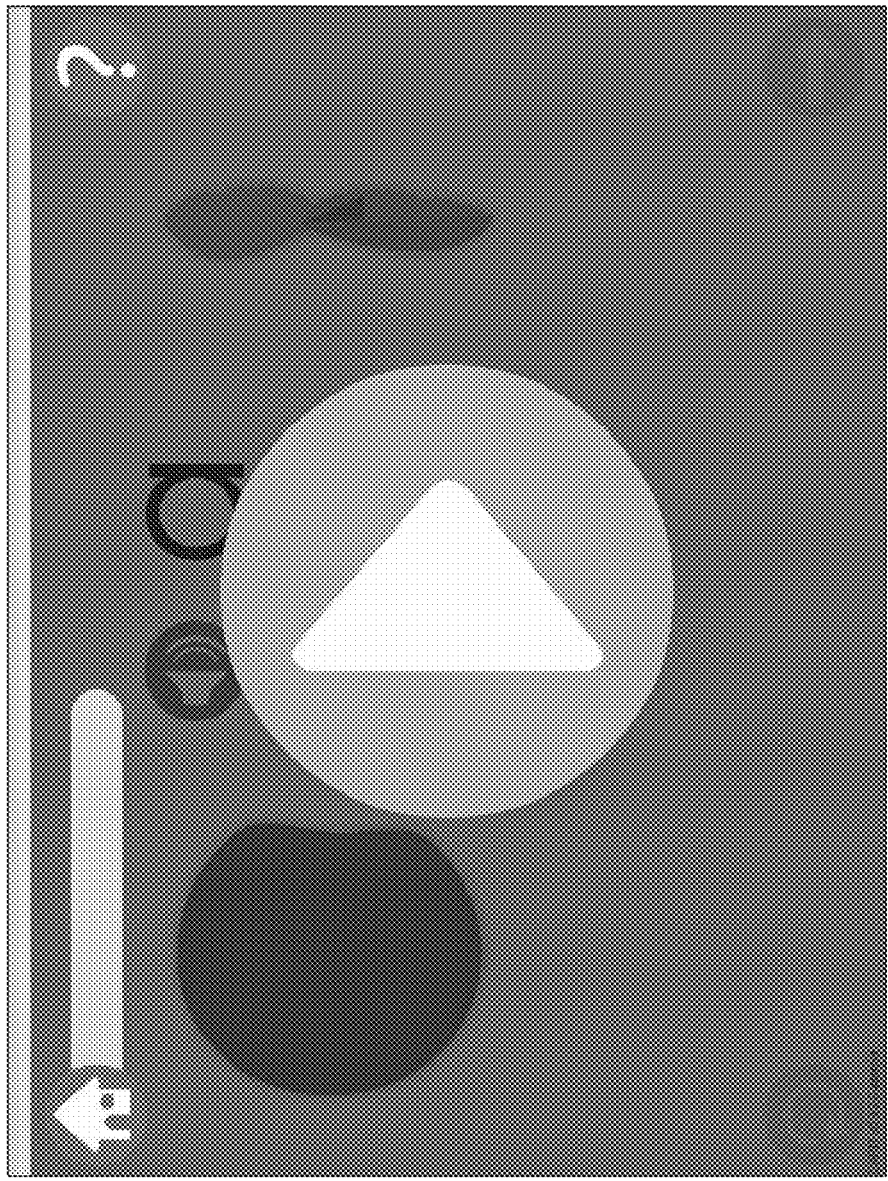
FIG 3D1

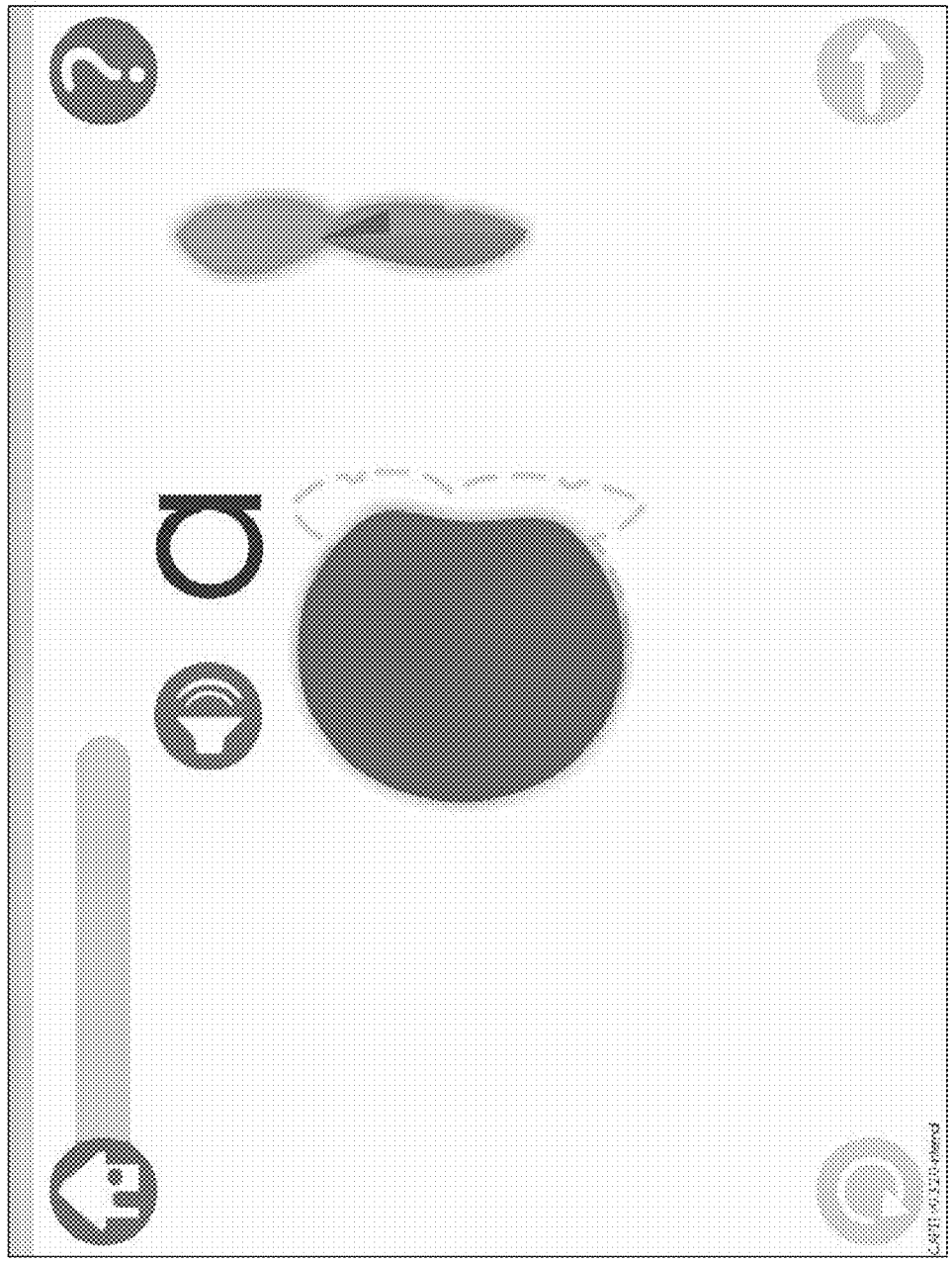

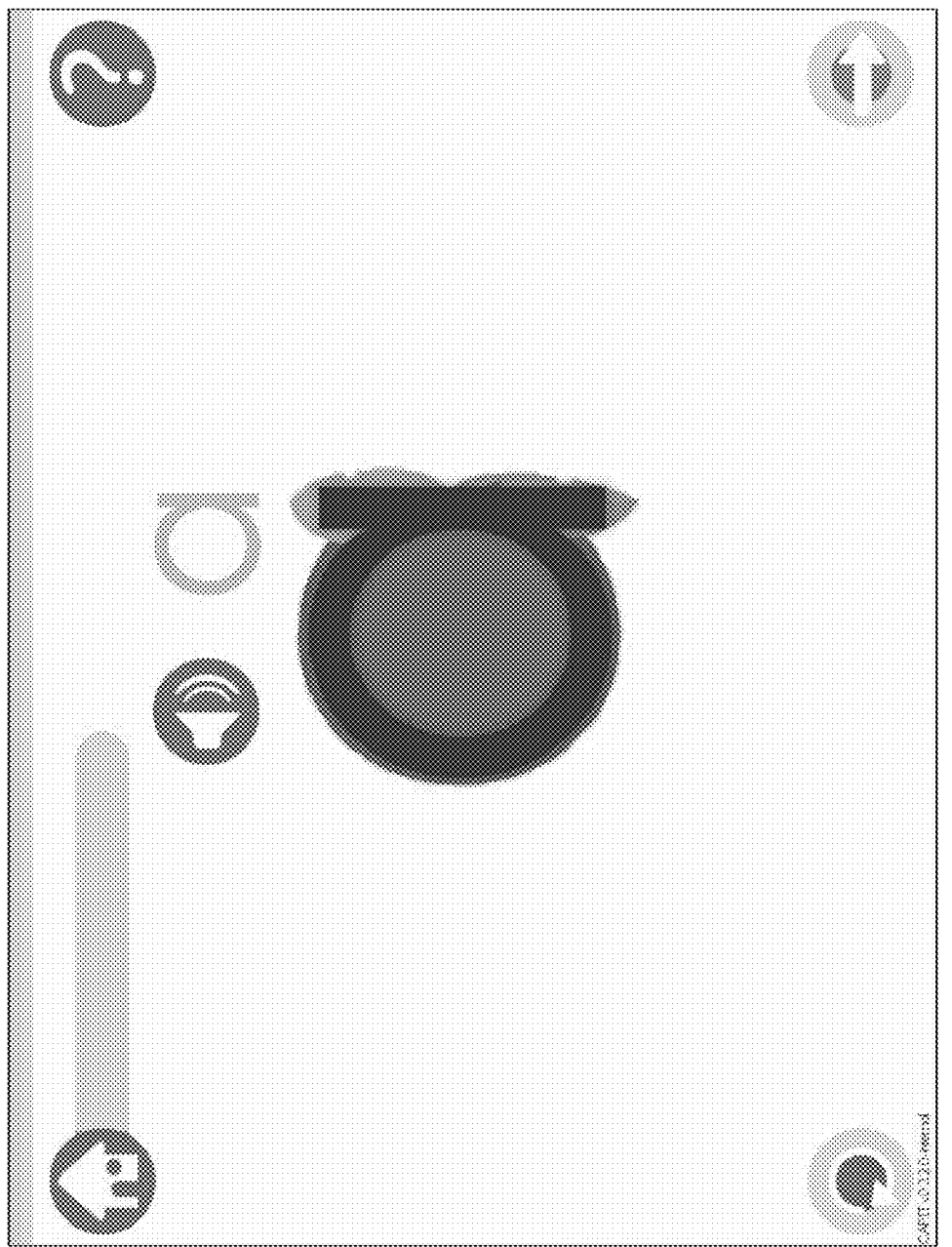

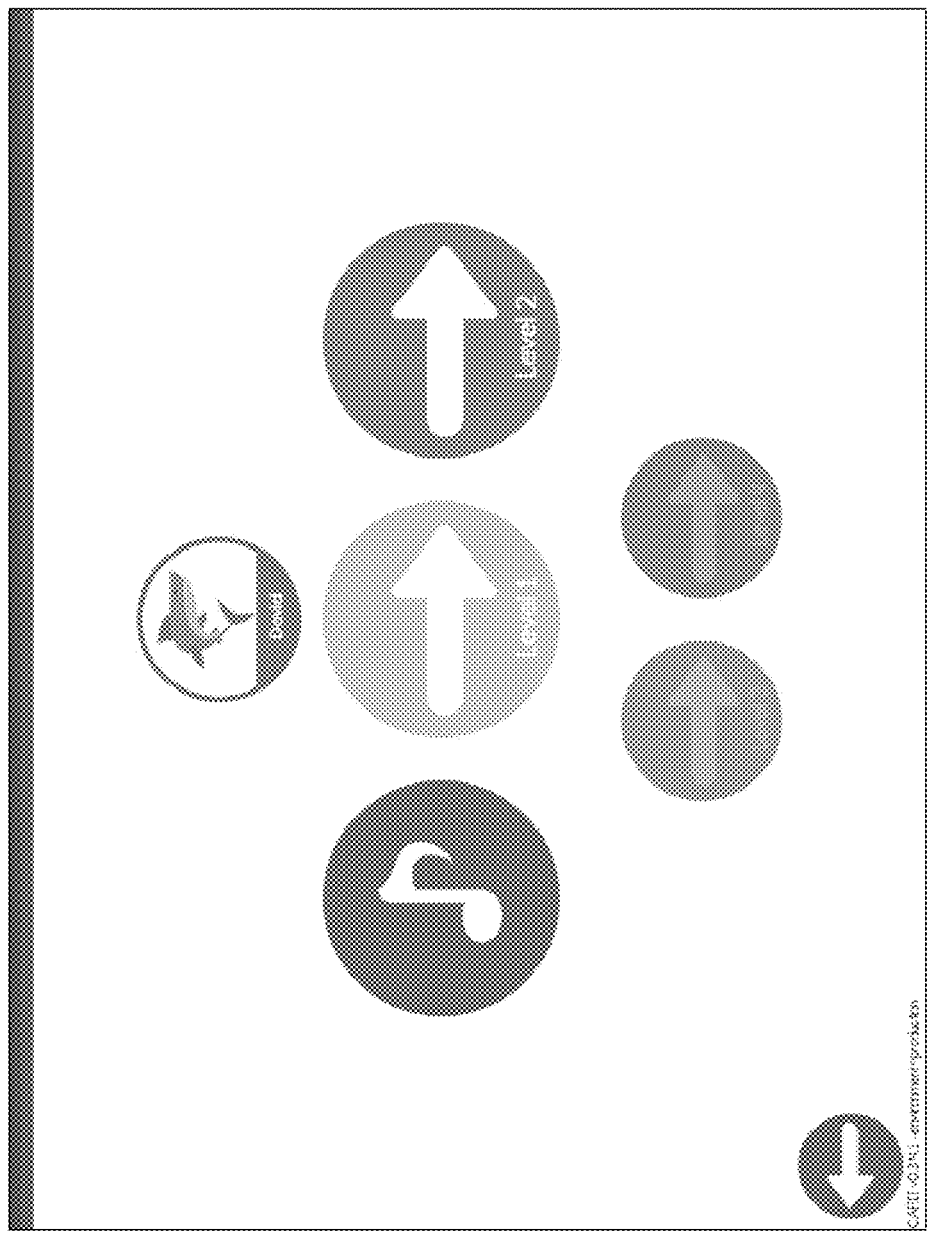

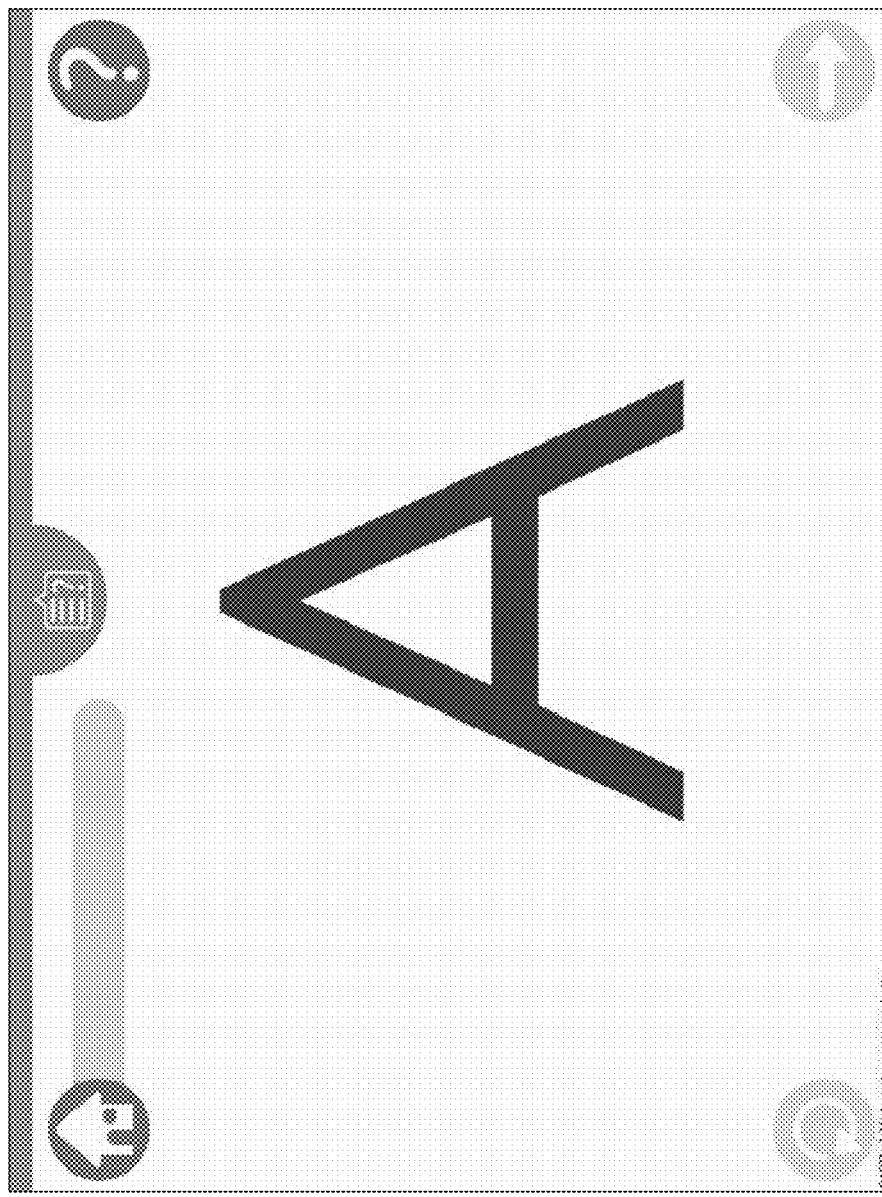

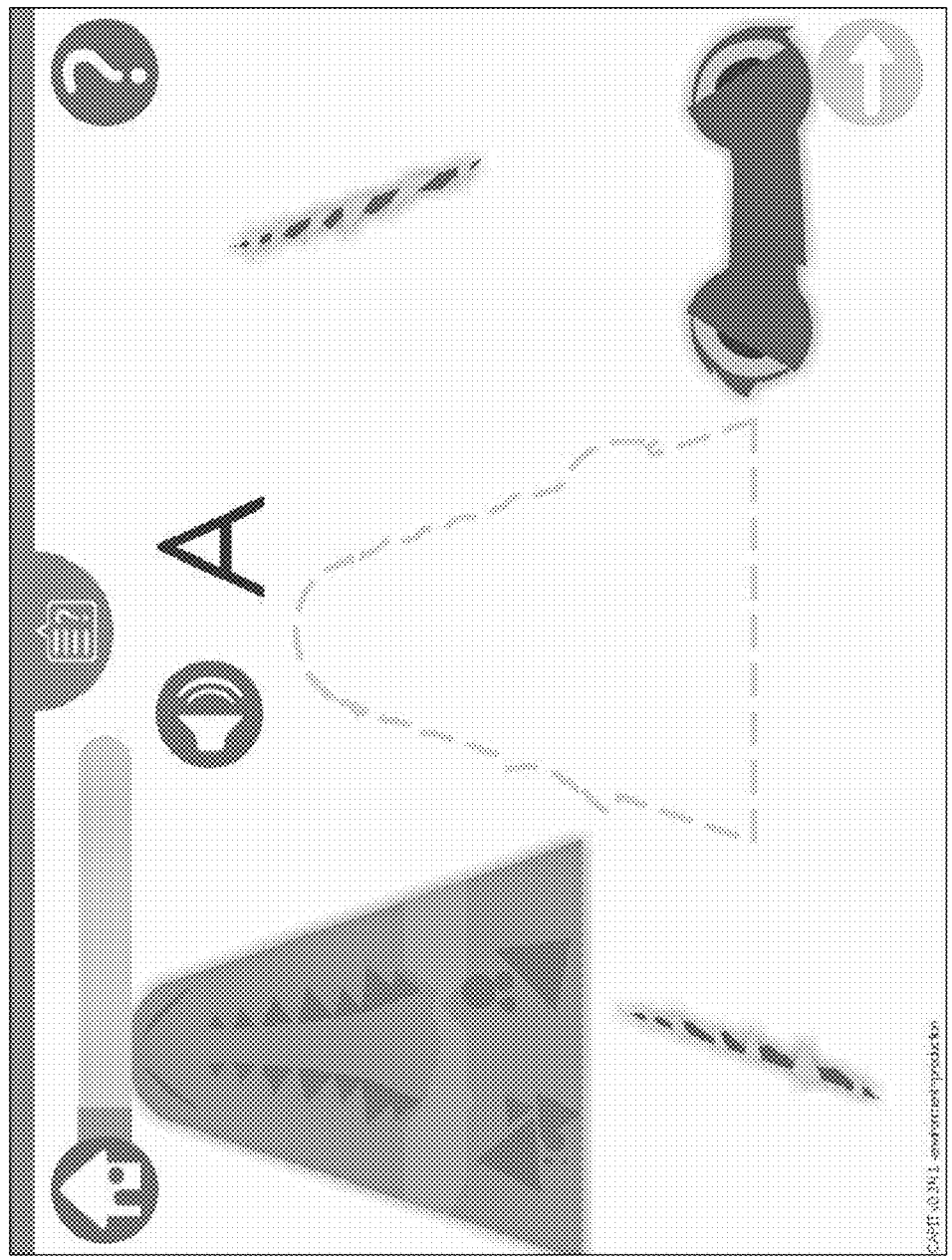

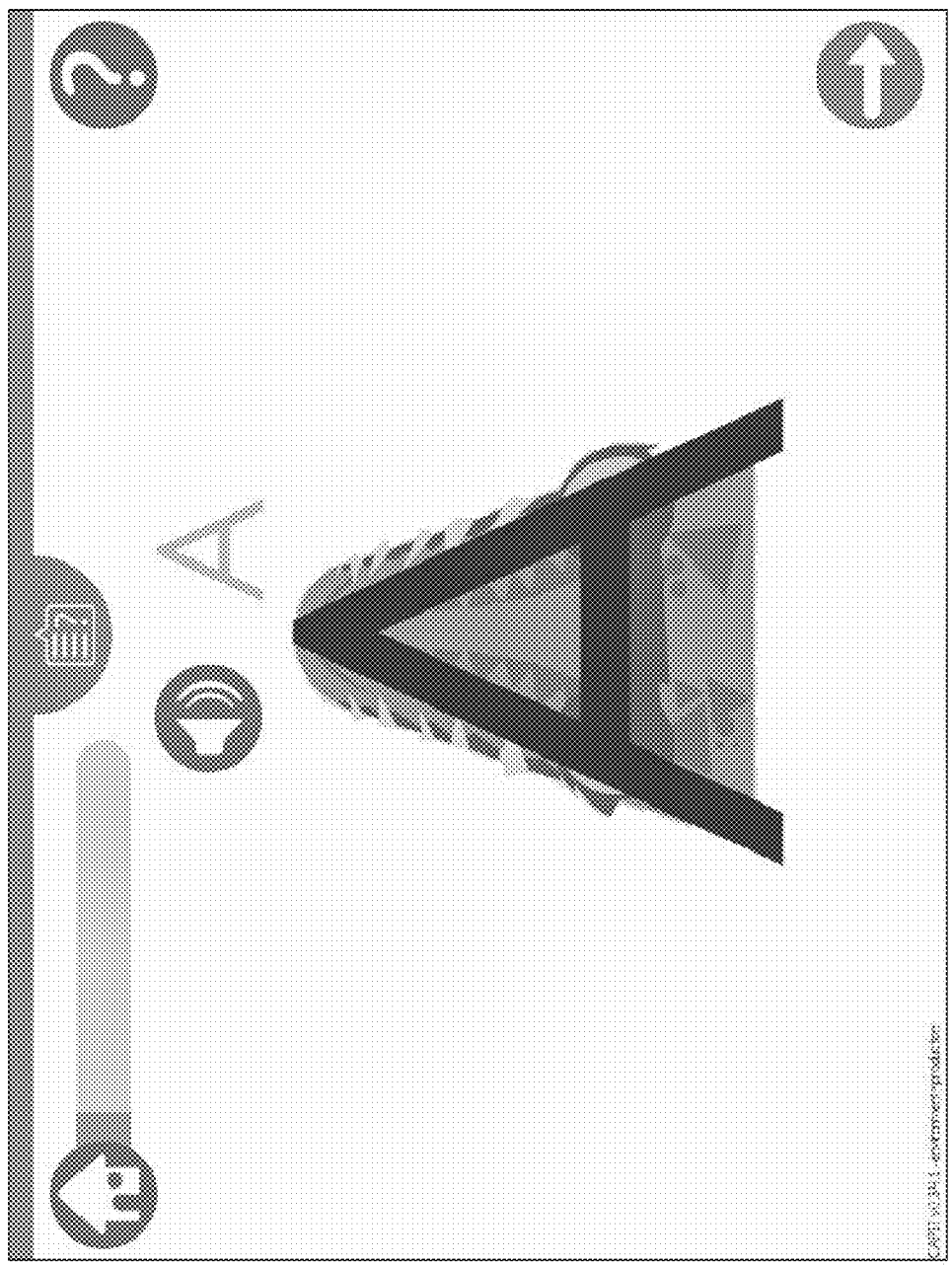
FIG 4D2

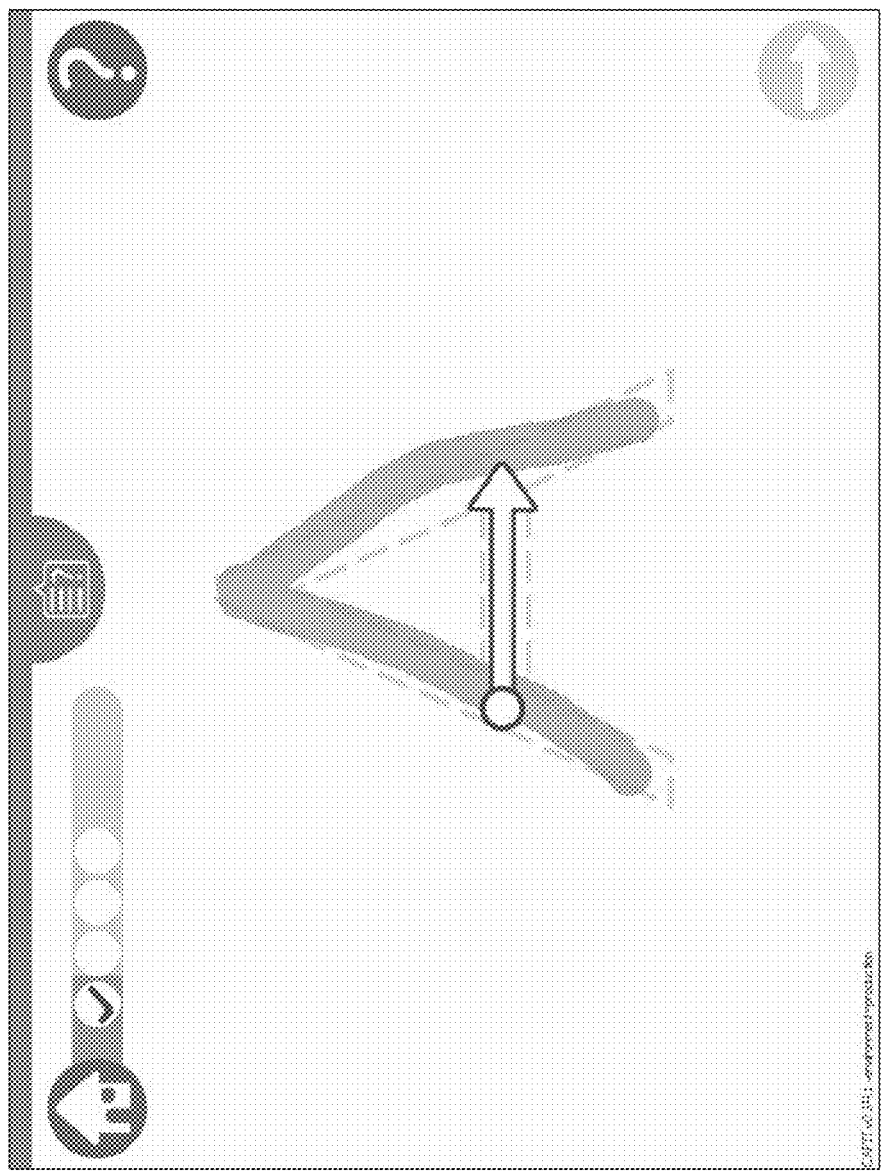

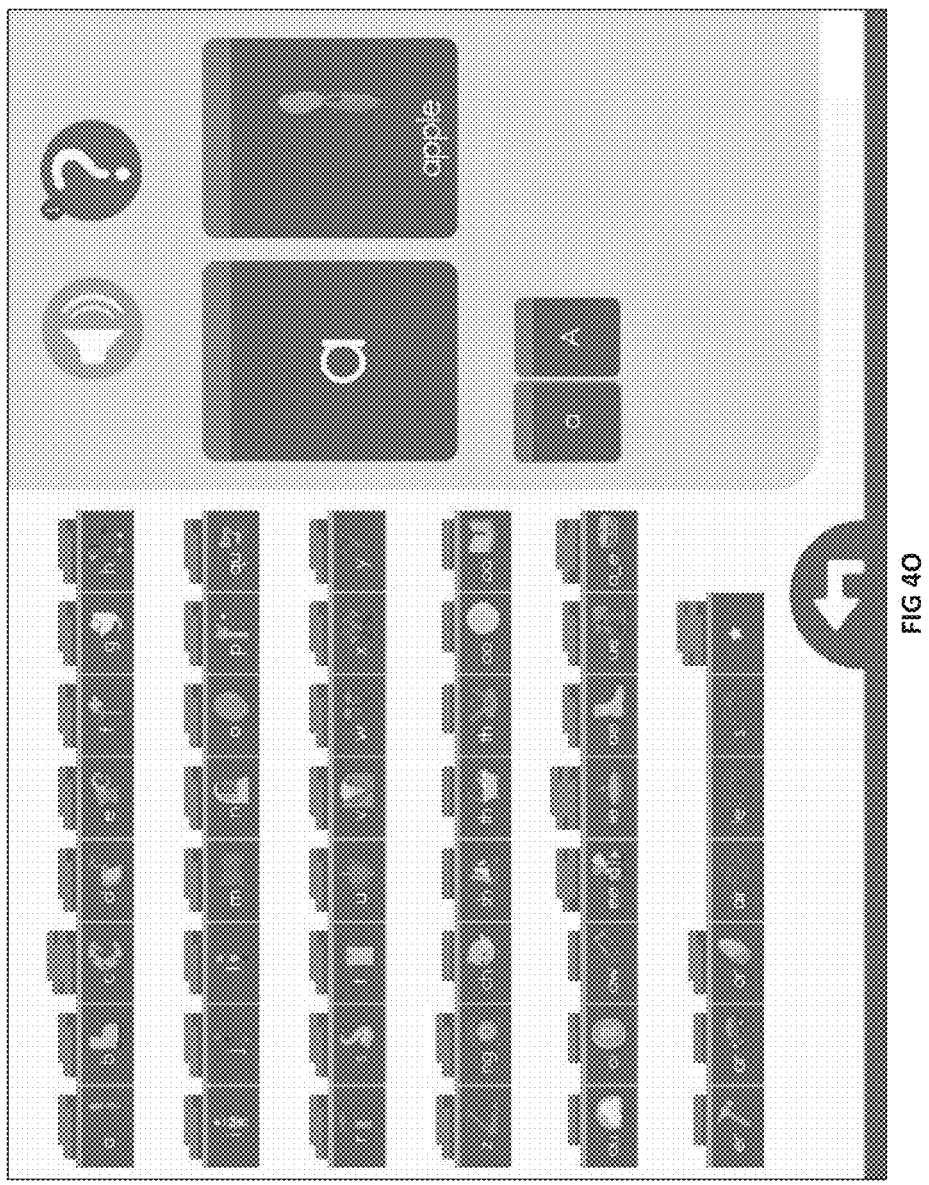

TOUCH SCREEN FINGER TRACING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference in their entirety under 37 CFR 1.57.

BACKGROUND OF THE INVENTION

Field of the Invention

The presented invention relates in general to a touch device, and more particularly to a method for detecting and tracking finger and other gestures using a touch device.

Description of the Related Art

Touch devices, such as tablets and touchscreen laptops, are becoming increasingly prevalent. However, certain applications have not taken adequate advantage of such touch technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of this disclosure relates to example touch devices and methods for detecting and tracking finger and other gestures using a touch device.

An aspect of this disclosure relates to a portable electronic device having a touch user interface, the portable electronic device comprising: a touch display configured to sense contact with a finger or stylus and to display visual content; a speaker; a processing system comprising at least one computing device, the processing system configured to communicate with the touch display and the speaker; and non-transitory memory that stores instructions that when executed by the processing system cause the portable electronic device to perform operations comprising: display a first iteration of a first symbol, wherein the first iteration of the first symbol is displayed without trace indicator line segments; generate a sound corresponding to the first symbol using the speaker; display a second iteration of the first symbol using a set of trace indicator line segments comprising a trace direction indicator and a trace termination indicator; highlight an end region of a first of the trace indicator line segments; detect user touch input at a plurality of locations on the touch display; based at least in part on the detected user touch input at the plurality of locations, determine whether the user has traced the first trace indicator line segment from the highlighted end region to the termination indicator in a direction corresponding to the trace direction indicator; draw and maintain a color line corresponding to the detected user touch input at the plurality of locations at least partly in response to a determination that the user has traced the first trace indicator line segment from the highlighted end region to the termination indicator in a direction corresponding to the trace direction indicator.

An aspect of this disclosure relates to method for processing touch inputs received via a touch device, the method comprising: displaying via a touch display of the touch device a first iteration of a first symbol, wherein the first iteration of the first symbol is displayed without trace indicator line segments; generating a sound corresponding to the first symbol; displaying via the touch display of the touch device a second iteration of the first symbol using a set of trace indicator line segments comprising a trace direction indicator and a trace termination indicator; highlighting via the touch display of the touch device a first region of a first of the trace indicator line segments; detecting user touch input at a plurality of locations on the touch display; based at least in part on the detected user touch input at the plurality of locations, determining whether the user has traced the first trace indicator line segment from the highlighted end region to the termination indicator in a direction corresponding to the trace direction indicator; drawing and maintaining a color line corresponding to the detected user touch input at the plurality of locations at least partly in response to a determination that the user has traced the first trace indicator line segment from the highlighted first region to the termination indicator in a direction corresponding to the trace direction indicator.

An aspect of this disclosure relates to method for processing touch inputs received via a touch device, the method comprising: displaying via a touch display of the touch device a first iteration of a first symbol, wherein the first iteration of the first symbol is displayed without trace indicator line segments; generating a sound corresponding to the first symbol; displaying via the touch display of the touch device a second iteration of the first symbol using a set of trace indicator line segments comprising a trace direction indicator and a trace termination indicator; highlighting via the touch display of the touch device a first region of a first of the trace indicator line segments; detecting user touch input at a plurality of locations on the touch display; based at least in part on the detected user touch input at the plurality of locations, determining whether the user has traced the first trace indicator line segment from the highlighted end region to the termination indicator in a direction corresponding to the trace direction indicator; providing a confirmation indicator indicating that the user has traced the first trace indicator line segment from the highlighted first region to the termination indicator in a direction corresponding to the trace direction indicator.

An aspect of this disclosure relates to a method for processing touch inputs received via a touch device, the method comprising: displaying via a touch display of the touch device a first iteration of a first symbol using a set of trace indicator line segments comprising a trace direction indicator and a trace termination indicator; highlighting via the touch display of the touch device a first region of a first of the trace indicator line segments; detecting user touch input at a plurality of locations on the touch display; based at least in part on the detected user touch input at the plurality of locations, determining whether the user has traced the first trace indicator line segment from the highlighted region to the termination indicator in a direction corresponding to the trace direction indicator; providing a confirmation indicator indicating that the user has traced the first trace indicator line segment from the highlighted first region to the termination indicator in a direction corresponding to the trace direction indicator.

An aspect of this disclosure relates to a non-transitory memory that stores instructions that when executed by a computing system cause the computing to perform operations comprising: display a first iteration of a first symbol, wherein the first iteration of the first symbol is displayed without trace indicator line segments; generate a sound corresponding to the first symbol; display a second iteration of the first symbol using a set of trace indicator line segments comprising a trace direction indicator and a trace termination indicator; highlight an first region of a first of the trace indicator line segments; detect user touch input at a plurality of locations on the touch display; based at least in part on the detected user touch input at the plurality of locations, determine whether the user has traced the first trace indicator line segment from the highlighted first region to the termination indicator in a direction corresponding to the trace direction indicator; draw and maintain a color line corresponding to the detected user touch input at the plurality of locations at least partly in response to a determination that the user has traced the first trace indicator line segment from the highlighted first region to the termination indicator in a direction corresponding to the trace direction indicator.

BRIEF DESCRIPTION OF THE DRAWINGS

Embodiments will now be described with reference to the drawings summarized below. These drawings and the associated description are provided to illustrate example embodiments, and not to limit the scope of the invention.

FIGS. 3A-3H illustrate example user interfaces corresponding to a first example process.

DETAILED DESCRIPTION

Figure 1:
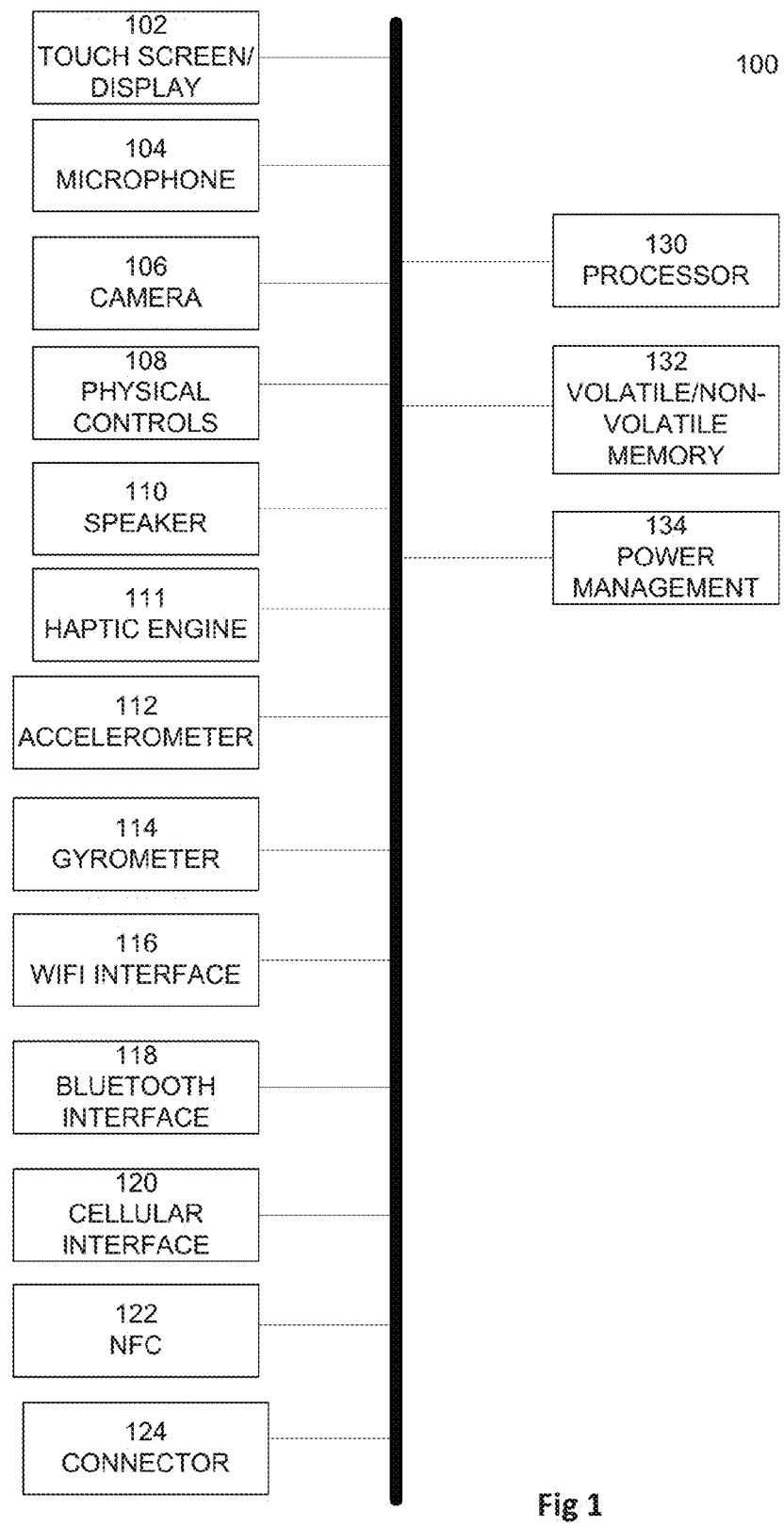
FIG. 1 illustrates an example touch device architecture.

Described herein, among other features, example touch devices and methods for detecting and tracking finger and other gestures using a touch device.

An example touch device architecture may be configured to receive and interpret user input via a touch sensitive input device (e.g., a touchscreen). For example, the user input may be via a single digit (e.g., a single finger), or via multi-touch, where two or more fingers are used at the same time to provide input via the touch sensitive (e.g., via a multi-finger gesture, such as pinch and zoom). Correspondingly, the touch device may be configured to detect one or more points of contact via the touch sensitive surface, and determine the location (e.g., X, Y coordinates, grid number, etc.) of such points of contact. The touch device, and associated software, may be used for a variety of different applications, such as computer aided design (e.g., to enable a user to draw architectural diagrams, network layouts, circuits, etc.), education, and electronic music instruments.

The touch device may be configured with a stylus and may be configured to receive input from a user via the stylus in addition to or instead of a finger. It is understood that while the description herein may refer to an input provided via a finger, optionally the input may also be provided via a stylus. The touch device may optionally include a soft keyboard displayed via the touchscreen and/or a physical keyboard. The touch device may be a portable tablet computer, a smart phone, a touchscreen laptop, a touchscreen desktop computer or other touch-enabled device. By way of example, the touch device may have a display (e.g., an LCD display, an OLED display, a liquid paper display, or other display) having a diagonal dimension between 4-17 inches, 6-13 inches, or 7.9-12.1 inches. By way of further example, the touch device display may have about a 16:9 aspect ratio, a 4:3 aspect ratio or other aspect ratio. The touch device may optionally be sized to be easily held by a child between the ages of 4-7. For example, the touch device may optionally be 6-8 inches in height, 4-6 inches in width, and 0.2-0.5 inches thick, although other dimensions and configurations may be used. For example, the touch device may optionally be 8-12 inches in height, 6-9 inches in width, and 0.2-0.5 inches thick.

As noted above, the touch device be configured with a touch sensitive display and may be configured to render digital files and data via the display. The touch device may be configured to render images in color. The touch device may be configured with an audio decoder and speakers to reproduce digital audio data. The touch device may be configured with a microphone, audio encoder, and speech recognition system. The touch device may be configured with a haptic output mechanism that simulates the sense of touch by applying forces, vibrations, or motions to the user (e.g., to the user finger or via a stylus).

The touch sensitive screen may be configured to detect touch and/or pressure via one or more techniques. For example, the touch device may be configured with a capacitive touch sensitive screen, a resistive touch sensitive screen, an optical touch sensitive screen, or otherwise. Optionally, the touch sensitive screen may be configured to detect a size of a contact area of a finger with the touchscreen (e.g., to determine how much pressure is being applied to the touchscreen per a given area).

The touch device may be configured to determine if a finger or stylus has contacted the touchscreen, if the contact has moved, the direction, speed, acceleration, and/or magnitude of the movement, and detect when the contact has been removed (e.g., the user has removed their finger or stylus from the touchscreen). The touch device may be configured to determine if a finger or stylus has contacted the touchscreen where a control is displayed and infer that the user is attempting to activate the control. Similarly, the touch device may be configured to determine if a finger or stylus has contacted the touchscreen where an object is being displayed using a finger, and that the user is moving the finger to a new location without breaking contact with the touchscreen. The touch device may infer the user intends to drag the object to the new location and may cause the object to appear to be dragged across the display. By way of further example, a given displayed object may be associated with a sound, and the touch device may play the associated sound in response to an action (e.g., the user touching the object, in response to a program instruction, etc.).

The touch device may be configured to determine or infer when a user is inadvertently touching the screen (e.g., with a palm or stomach) and reject such touch as a valid input (e.g., not respond to the inadvertent touch). For example, the touch device may analyze spatiotemporal features by examining touch properties and movement over a short time window to identify a touch as being an inadvertent touch, and may therefore inhibit a response by the touch device to the inadvertent touch.

Optionally, the touch device may be configured with various sensors, such as accelerometers, gyrometers, temperature sensors, cameras (e.g., a front facing camera, a back facing camera, stereo cameras, etc.), fingerprint detectors, etc. Such sensors may enable the touch device to detect movement, speed of movement, device orientation, fingerprints, and/or other inputs or environmental conditions.

In the example illustrated in FIG. 1, a touch device 100 includes various user input/output devices, such as a touchscreen/display 102, a microphone 104, a camera 106, physical controls 108 (e.g., a power on/off control, a volume control, a home control, etc.), a speaker 110, and/or other user input/output devices. The touch device 100 may optionally include a haptic engine 111 that provides kinesthetic communication to the user (e.g., via vibrations or taps), an accelerometer 112 that measures acceleration in 1-3 directions, and a gyrometer (e.g., a 3-axis gyroscope) 114 that measures orientation in three axis.

The touch device 100 may be equipped with an external or integral physical keyboard, trackpad, joystick, electronic pen, and/or other input device.

The touch device 100 may include one or more wireless and/or wired interfaces. For example, the touch device 100 may include a WiFi interface 116, a Bluetooth interface 118, a cellular interface 120, an NFC (near field communication) interface 122, and/or one or more physical connectors 124 (e.g., a USB connector, a LIGHTING connector, and/or other connector). The touch device 100 further comprises a processor device (e.g., a microprocessor) 130, volatile memory (e.g., RAM solid state memory) and non-volatile memory (e.g., FLASH memory), and a power management device 134.

Figure 2A:
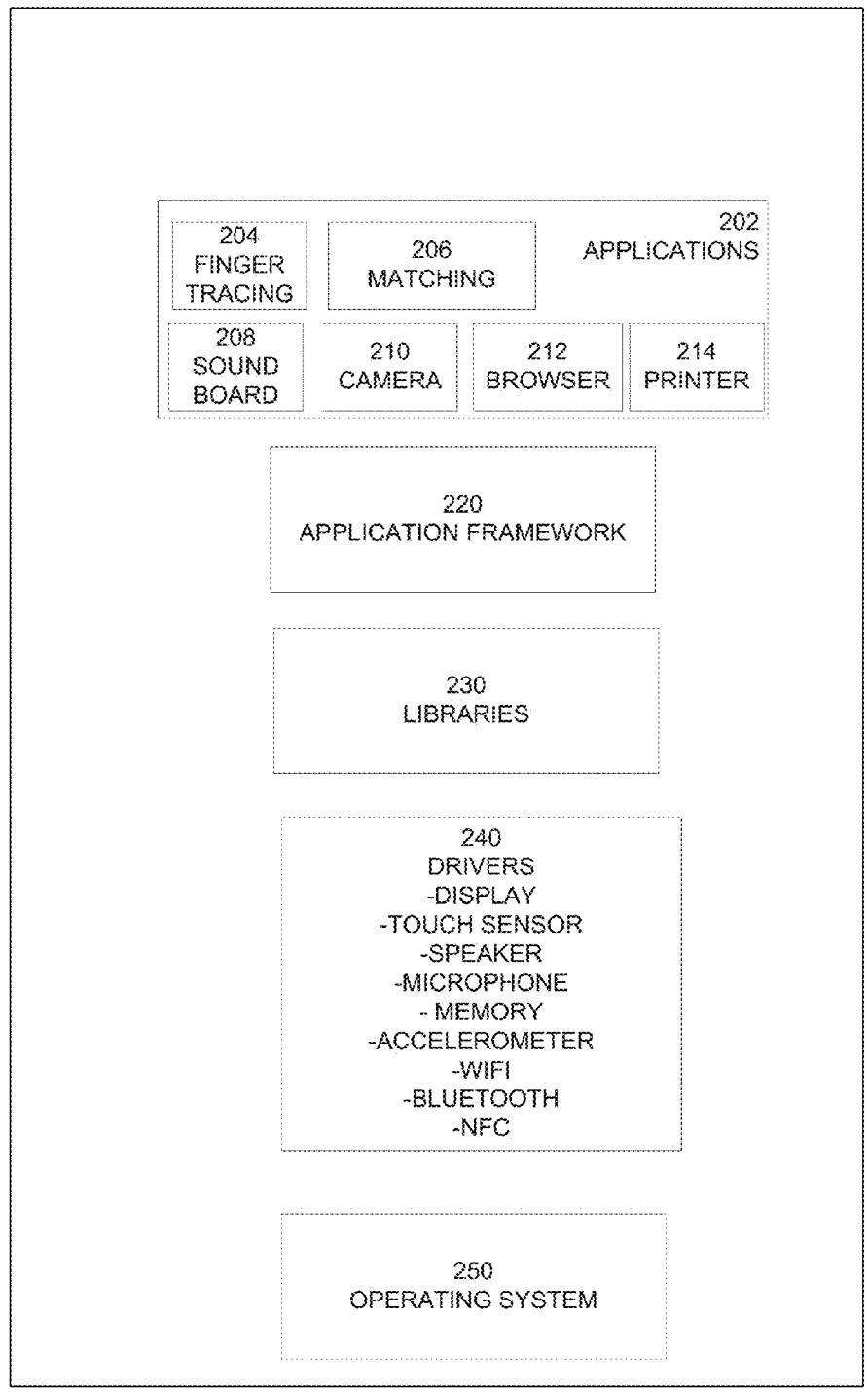
FIG. 2A illustrates an example software architecture.

FIG. 2A illustrates an example software architecture for the touch device 100. The software architecture may include an operating system 250 (e.g., GOOGLE ANDROID, APPLE iOS, MICROSOFT WINDOWS, APPLE OS, UNIX, LINUX, etc.), drivers 240 (e.g., display, touch sensor, speaker, microphone, memory, accelerometer, WiFi, Bluetooth, NFC, etc.), libraries 230 (e.g., SSL, Webkit, SQL, etc.), an application framework 220, and applications 202. For example, the applications 202 may include a finger tracing application 204, a matching application 206, a soundboard application 208, a camera application 210, a browser application 212, a printer application 214 and/or other applications. A given application may utilize another application as part of its operation. For example, the sound board application 208 may call the finger tracing application 204, the matching application 206, and the printer application 214. Two or more of the applications may be integrated into a single application.

Figure 2B:
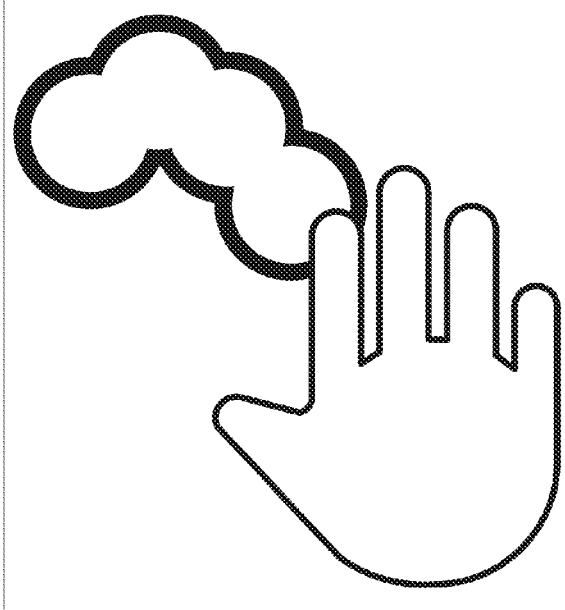
FIGS. 2B-2C illustrate an example of a user interacting with a touch device.

The finger tracing application 204 may be configured to receive touch input via the touchscreen 102. FIG. 2B illustrates an example of a user interacting with the touchscreen 102 by dragging a finger across the touchscreen 102. The finger tracing application 204 may be configured to determine a movement vector for a moving finger indicating the amount of movement, speed and/or the direction/angle of movement. The direction of movement may be defined using a polar coordinate system in which given point on a plane is determined by a distance from a reference point and an angle from a reference direction. Optionally in addition or instead, the direction of movement may be defined using a Cartesian coordinate system that uniquely specifies a given point in a plane by a pair of numerical coordinates (e.g., X, Y coordinates), which may be the signed distances to the point from two fixed perpendicular directed lines (e.g., X, Y lines) that meet at an origin (e.g., 0,0), measured in the same unit of length.

The finger tracing application 204 may be configured to sense if the user is pushing a touch beyond a specified threshold and/or an amount of pressure (e.g., lbs/inch of pressure) or level of a touch (e.g., a soft touch, a medium touch, and/or a hard touch). For example, strain gauges may be provided integral to or attached to the touchscreen 102 that measure pressure.

The finger tracing application 204 may be configured to determine the current and/or past location of a finger touch relative to an object displayed on the touchscreen, and may project, based on a finger movement vector, a future position of the finger. For example, the finger tracing application 204 can detect when the user is touching a control displayed via the touchscreen. By way of illustration, the control may be a color selection control, a paint brush control (where there may be multiple brushes of different widths to select from), a pen control (where there may be multiple pens of different widths to select from), a sound generation control, or other control. In addition, the finger tracing application 204 may detect when the user is moving a finger within (and/or outside of) a stenciled symbol (e.g., an outline of a letter, number, or other written symbols or graphemes or combinations thereof).

The tracing application 204, may detect and record a user selection of a color and/or brush. The tracing application 204 may then detect the movement of the user finger across the touchscreen or a selected area of the touchscreen (e.g., a drawing area that may optionally include a symbol outline), and may fill-in the portions of the touchscreen touched by the user with the selected color, optionally using a drawing tool (e.g., a brush or pen) and drawing tool width selected by the user.

Optionally, the tracing application 204 may detect if the user is drawing outside a specified area (e.g., outside of a symbol) or more than a certain threshold distance outside the specified area and may provide an indication to the user of a failure to draw within the specified area. For example, the indication may be an audible sound (e.g., a phrase (e.g., "draw within the letter"), a beep, etc.), a visual indicator (e.g., a phrase (e.g., "draw within the letter"), an icon, haptic feedback (e.g., a vibration)), and/or a by inhibiting the display of any color the user is attempting to apply outside the specified area. The use of such thresholding may be utilized to overcome the technical challenge of resolving ambiguous user inputs.

The tracing application 204 may also enable a user to drag puzzle pieces displayed via the touchscreen to a specified area to form an object composed of the puzzle pieces. By way of example, the specified area may be an outline of a letter (e.g., the letter "a"), and the puzzle pieces may include an apple piece and a leaves piece (e.g., attached to an apple stem). The tracing application 204 may instruct or may indicate that the user is to drag the apple piece and the leaves piece to the "a" area so as to form a shape that corresponds to the letter "a".

The tracing application 204 may also cause the touch device 100 to enunciate, via one or more speakers, sounds, phonemes, letters, and/or words which correspond to a letter or set of letters being displayed by the tracing application 204.

Example user interfaces will now be described. It is understood the fewer, additional, or different user interfaces may be utilized, and that various subsets of the example user interfaces may be utilized by a given process. FIGS. 3A-3H illustrate example optional user interfaces that may be used in conjunction with the tracing application 204 and/or other applications. In the illustrated example, the tracing application is being used in conjunction with an application configured to demonstrate how to decode a language by breaking the language down into components (e.g., its smallest components, such as letters and phonemes). Interactive user interfaces are provided that use images and/or motion, and that are configured to receive and respond to user touch. Audible information may be provided using the touch device speaker(s), where the audio information may include sounds corresponding to a phoneme, a letter, a letter name, and/or phrases or sentences that demonstrate the use of a word that includes the letter. Tunes, songs, or phrases may be generated by the tracing application via the touch device and played during transitions from one user interface to another. At the top of some or all of the user interfaces a help control (e.g., "?") may optionally be provided, which when touched by the user causes the application to visually display the tasks the user is expected to accomplish with respect to the corresponding user interface.

Thus, the various example optional interfaces may demonstrate to users and drill users with respect to phonemes, language and symbols (e.g., letters) by providing mnemonics corresponding to symbols as well as mnemonics and puzzles to demonstrate and drill handwriting/tracing. The user interfaces, including audio generation, may demonstrate and drill some or all basic sounds for a given language (e.g., 46 sounds for American English, where a given sound may optionally be associated with a sound file stored on the touch device), and all the letters (e.g., in upper and lower case form) in the corresponding alphabet (e.g., optionally combinations of letters). For example, in English there are 26 letters (A-Z), and there may be an additional 20 sounds which may be represented by multiple letters (e.g., ng, ch, sh, th, th, oo, ou, oi, aw, ee, ie, oe, ue, a_e, er, ar, or, air, le, s). As discussed below, keyboards may be provided that further facilitate user recognition of a given symbol and a corresponding sound. Optionally, mnemonics may be provided for some or all spelling patterns in a given language (e.g., English), including those not represented by single letters. For example, the mnemonic "coin" may be used for the spelling "oi", or the mnemonic "bread" may be used for the spelling "ea" (which spells the sound "eh"), etc.

For example, a user may be instructed to draw the letter "a" so as to look like an apple. By way of further example, the user may be instructed to assemble puzzle pieces corresponding to an apple, and may instruct the user to drag the letter "a" so as to be superimposed over the apple. The touch device may track the user's movements (e.g., tracing of letters or moving of puzzle pieces) with respect to the touch screen to ensure that the user is correctly performing a corresponding task. The touch device may inhibit a user from moving to a next training state until a current task is successfully completed.

A menu may be provided enabling a user to select different levels of interaction complexity (e.g., different training processes of different difficulty). Optionally, the tracing application 204 may provide an interface via which a code is to be entered to access a given level. Optionally, a fingerprint sensor is utilized to identify the user using the user's fingerprint, and based at least in part on the user identification, the user is enabled to access a set of levels that the user has been previously authorized to access.

With reference to FIG. 3A, an electronic card bank is displayed, wherein a given letter corresponds to a letter of the alphabet of the language. The size of the card bank may be customized for a given user. Optionally, the number of letters/sounds included in the card bank may be dynamically adjusted based at least in part on the user successfully completing certain training processes. For example, initially a first set including only a limited number of letters may be included in the card bank (e.g., "A", "B", "C", "D"). After the user has completed the first set of letters, a second set of letters may be automatically added to the card bank (e.g., "E", "F", "G", "H"). Optionally, all the letters/sounds may be available in the card bank.

Figure 3B:
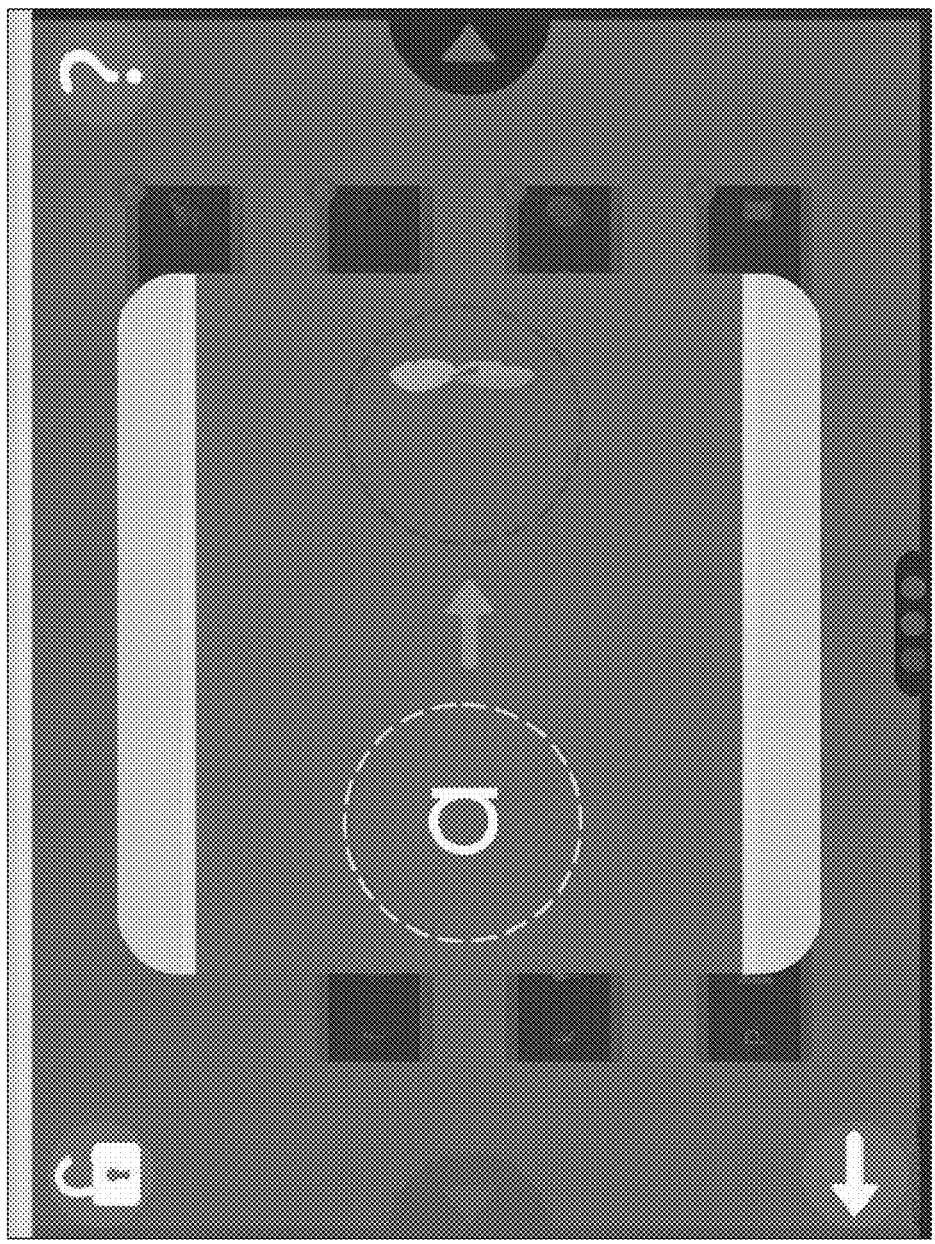

The user can select a given letter/sound (where a sound may be represented by more than one letter) from the card bank. Referring to FIG. 3B, optionally a pop-up window is generated and displayed. In this example, the pop-up window includes the selected letter (e.g., a lowercase "a") surrounded by a border (e.g., a broken circular border composed of dashes) and a mnemonic, such as a graphic or photograph of an item that has a shape similar to that of the selected letter (e.g., an apple), and that is likewise surrounded by a border. A graphic (e.g., an arrow), animation, text, and/or voice instruction is provided indicating that the user is to drag the letter over the item (e.g., with the border of the letter overlaying the border of the item). In response to detecting that the user has successfully touched the letter and dragged it with a finger over the item, a subsequent user interface, an example of which is illustrated in FIG. 3C, is automatically presented or is presented in response to the user selected a "next" control (e.g., an arrow). For example, the user may need to drag the letter so that the border of the letter and the border of the item overlap within a specified threshold distance (or that centers are within a specified threshold distance and/or the orientation of the letter is proper/vertical) in order for the touch device to determine that the user has successfully dragged the letter over the item.

Figure 2C:
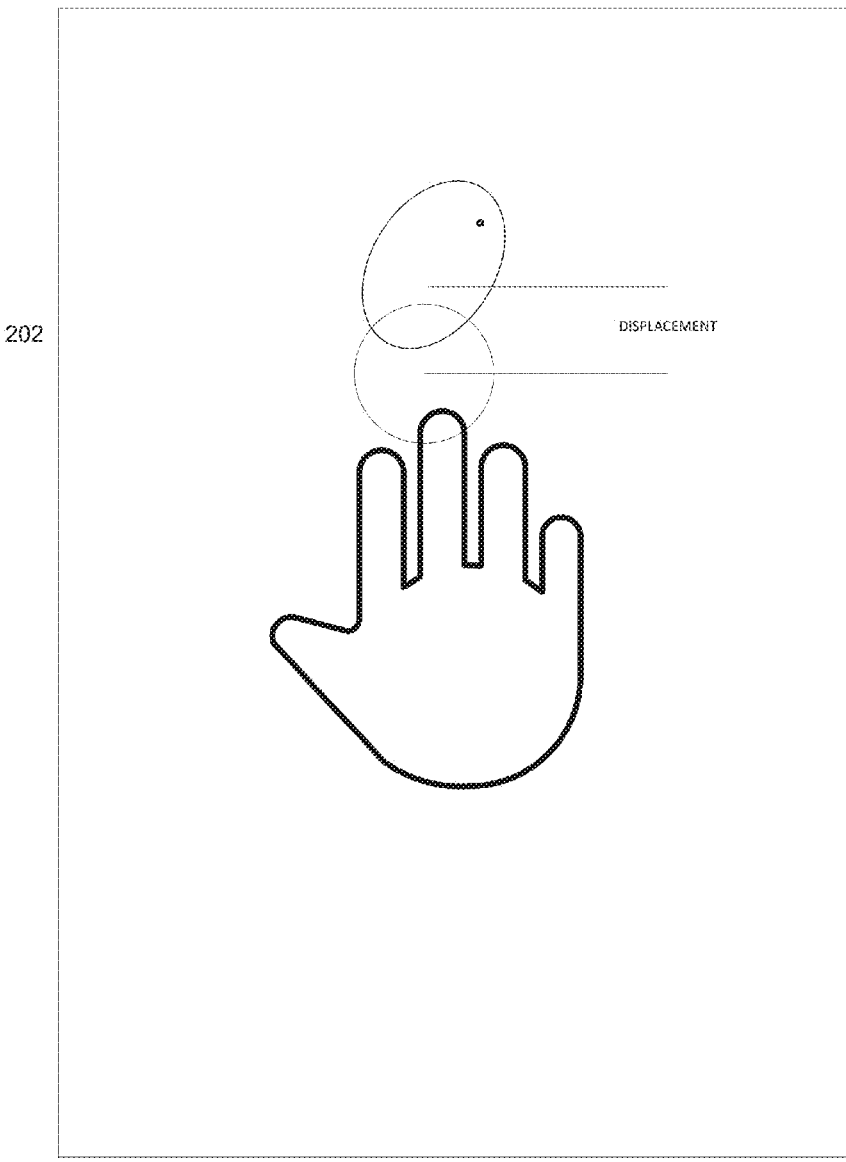

By way of illustration, as depicted in FIG. 2C, the application detects if the user has positioned via touch the letter "O" so that the displacement of the center of the letter is less than a threshold distance from the center of the olive, in order for the touch device to determine that the user has successfully dragged the letter over the item. Otherwise, the touch device may determine that the user has not yet successfully dragged the letter over the item.

The example user interface illustrated in FIG. 3C reproduces the selected letter, optionally using a larger font than used in the user interface illustrated in FIG. 3B. In addition, a voice reproduction or synthesis system included in the touch device generates a sound corresponding to the letter (e.g., "ahh"), a name of the item (e.g., apple), and/or a phrase that combines the sound with the name of the item (e.g., "ahh as in apple"). In response to the user activating a "next" control or automatically, the example user interface illustrated in FIG. 3D1 may be presented. In this example, a "play" control is provided. In response to detecting that the user has activated the "play" control, the touch device may play an animation or video. The graphic (or video) may dynamically illustrate a task that the user is to perform and/or may act as a memory aid. In this example and with reference to FIG. 3D2, puzzle pieces corresponding to the item illustrated in FIG. 3B are presented (e.g., a puzzle piece corresponding body of an apple and a puzzle piece corresponding to apple leaves) in addition to an outline of the item (e.g., a broken outline formed of dashes) and the selected letter. The animation depicts dragging the puzzle pieces to the shape outline. The letter is then automatically dragged over the assembled puzzle pieces (which have a shape similar to the letter), as illustrated in FIG. 3D3.

Figure 3E:
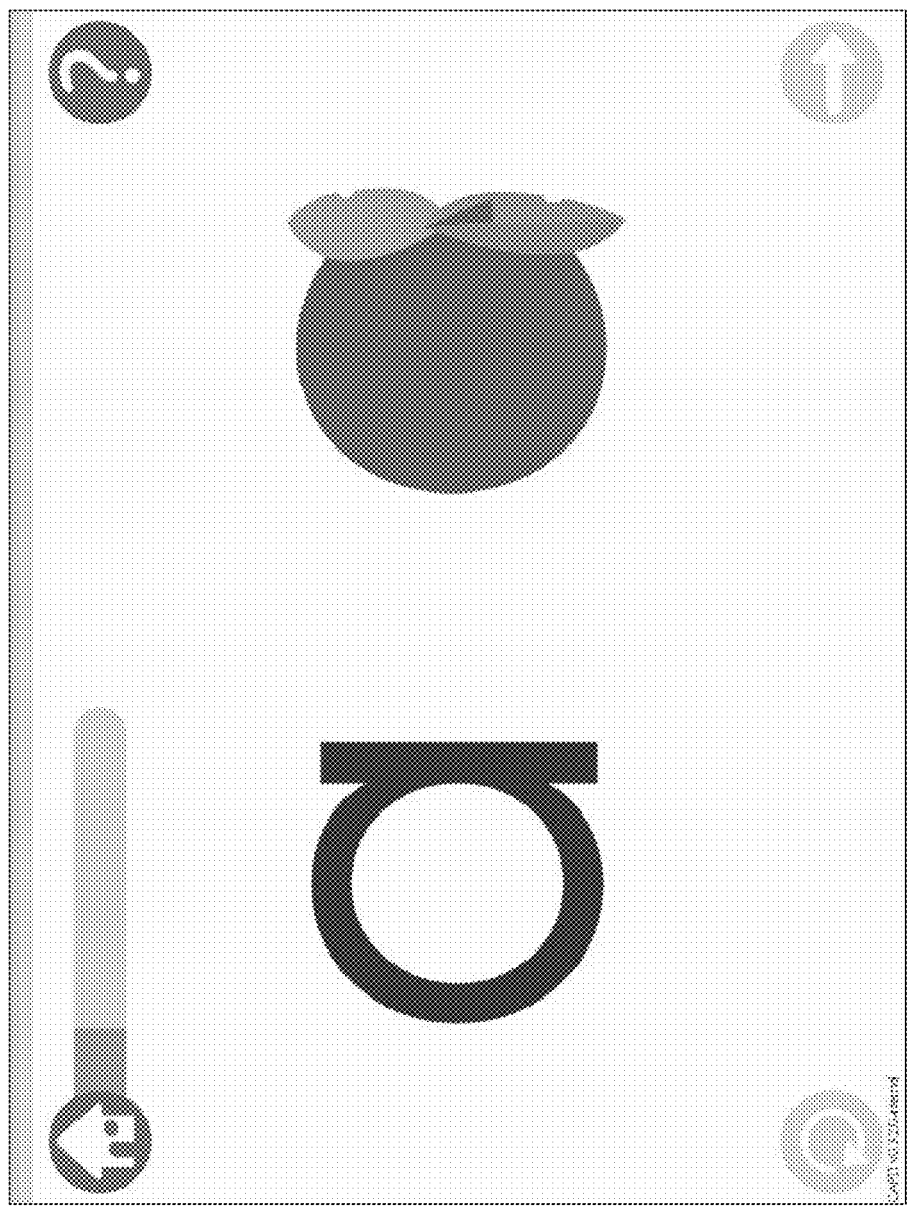

In response to the user activating a "next" control or automatically, the example user interface illustrated in FIG. 3E may be presented. The example user interface illustrates the letter and the item while changing the size of each to further emphasize the letter and the item. The touch device may play a song that includes the sound of the letter and the name of the item ("the apple sound says "aah, aah, aah"), and moves that letter and item towards each other until the letter overlays the item. Optionally, an image of the letter and the item may be presented in an animated fashion (e.g., displayed using graphics of cards), so that the letter and the item move across the user interface to (e.g., fly to) a control (sometimes referred to herein as a pocket chart access control) that can be later selected by the user. When the user selects the pocket chart access control, the letters/sounds that the user has mastered may be presented. The pocket chart access control itself may be animated when the letter and the item move to the pocket chart access control. For example, the pocket chart access control may optionally bounce up and down to provide positive feedback that the user successfully performed a task and/or to indicate the presence of the pocket chart access control to the user. The pocket chart will be discussed in greater detail elsewhere herein. The pocket chart access control may be presented in other user interfaces discussed herein and the user may access the pocket chart when viewing such other user interfaces by selecting (e.g., touching) the pocket chart access control. In response to the user activating a "next" control or automatically, the example user interface illustrated in FIG. 3F may be presented.

Figure 3F:
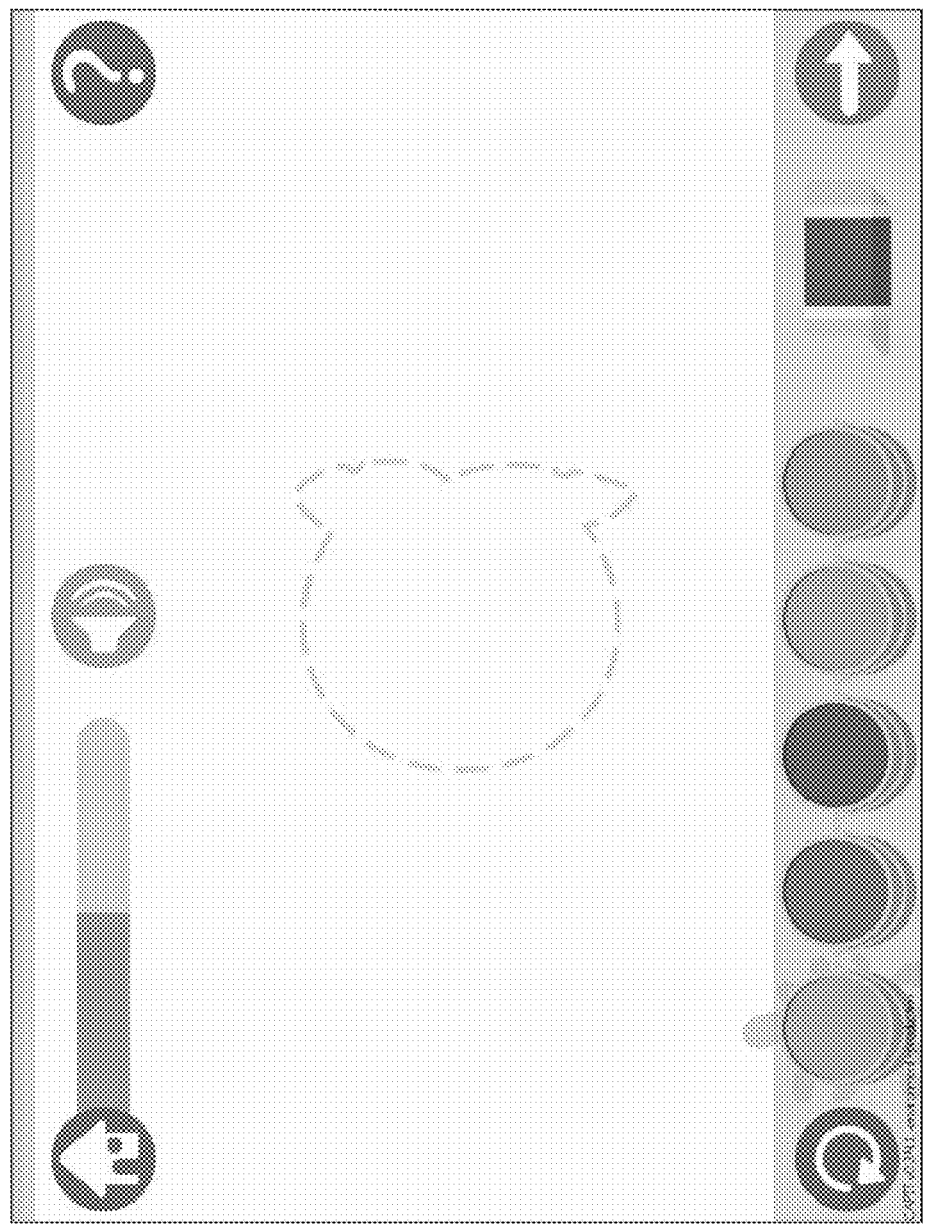

The example user interface in FIG. 3F illustrates an outline of the item (e.g., an apple), different color digital "paints" in graphic buckets, an eraser, a sound control (e.g., in the form of a speaker graphic), and a drawing area. The user interface enables the user to select a digital paint color by touching the corresponding paint, then paint the item within (and optionally outside of) the outline, within the drawing area, using the selected paint. For example, the user can select red and paint the body of the apple using red, and can then select green and paint the leaf portion of the apple using green. The user interface enables the user to touch the eraser image, and in response to detecting that the user has selected the eraser image and then detecting that the user is touching within the drawing area, erase color previously painted by the user. In response to detecting that the user has selected the sound control, the touch device may reproduce the sound of the letter (e.g., "aah").

Figure 3G:

In response to the user activating a "next" control or automatically, the example user interface illustrated in FIG. 3G may be presented. The example user interface in FIG. 3G illustrates an outline of the letter (e.g., "a"), different color digital "paints", an eraser, a sound control (e.g., a speaker icon), and a drawing area. The user interface enables the user to select a paint color by touching the corresponding paint, then paint the item within (and optionally outside of) the letter outline, within the drawing area, using the selected paint. The user interface enables the user to touch the eraser image, and in response to detecting that the user has selected the eraser image and then detecting that the user is touching the user's finger within the drawing area, erase color previously painted by the user. In response to detecting that the user has selected the sound control, the touch device may reproduce the sound of the letter (e.g., "aah"). Optionally, an interface is provided via which an administrator may share the electronic drawing (e.g., via email, an application, a website, an MMS message or otherwise) with one or more destinations (e.g., a parent).

Figure 3H:
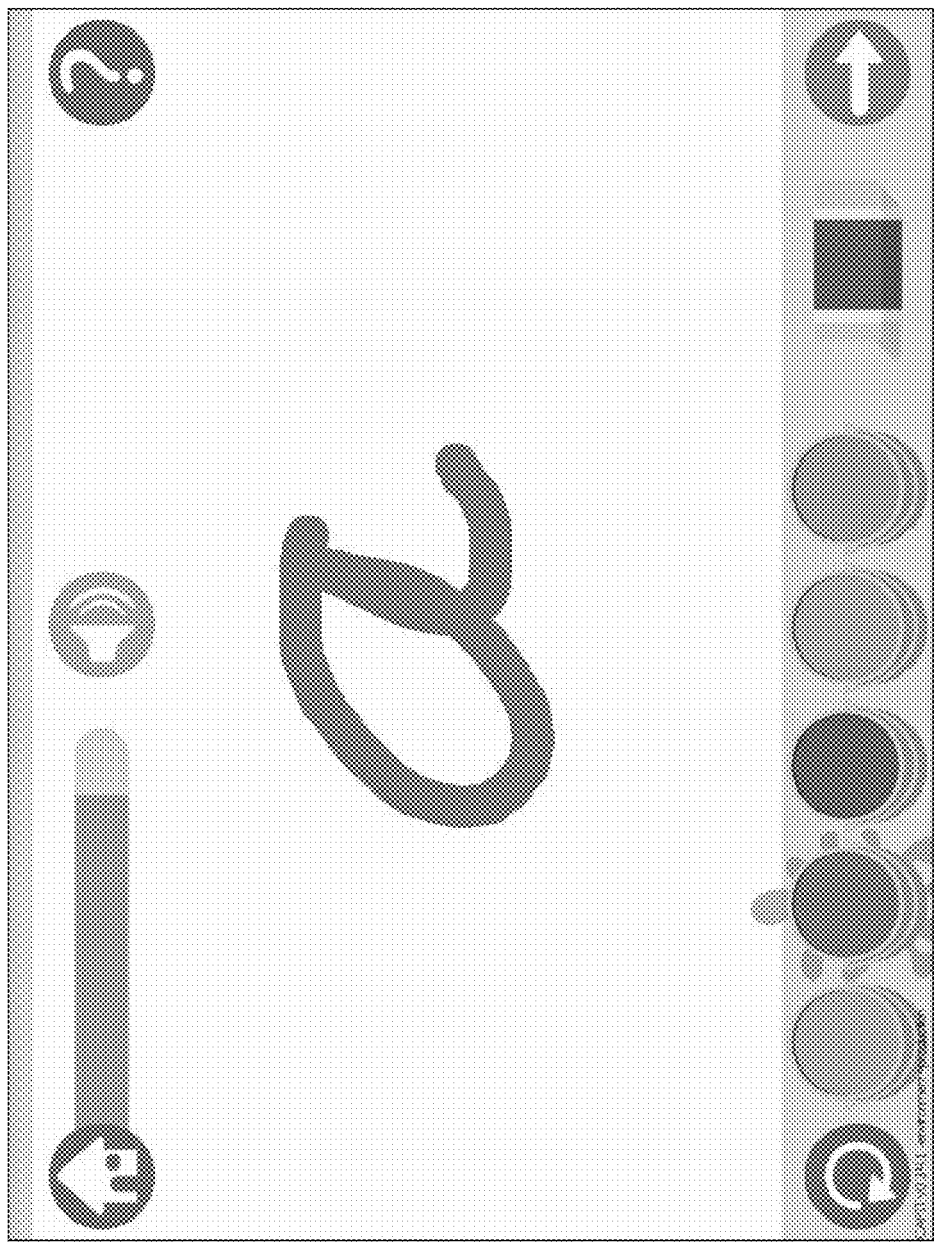

In response to the user activating a "next" control or automatically, the example user interface illustrated in FIG. 3H may be presented. The example user interface in FIG. 3H illustrates different color digital "paints", an eraser, a sound control (e.g., a speaker icon), and a drawing area. Optionally, the drawing area is empty in that it does not include an image of the letter or the item. Instead, the user may free draw either the letter or the item. The user interface enables the user to select a paint color by touching the corresponding paint, then paint (e.g., the letter and/or the item) within the drawing area, using the selected paint. The user interface enables the user to touch the eraser image, and in response to detecting that the user has selected the eraser image and then detecting that the user is touching within the drawing area, erase color previously painted by the user. In response to detecting that the user has selected the sound control (e.g., a speaker icon), the touch device may reproduce the sound of the letter (e.g., "aah").

Optionally, there may be multiple levels, having different levels of difficulty and advancement, with respect to demonstrating how to decode a language by breaking the language down into components. Optionally, the tracing application may require an administrator or other authorized user to enter a code in order to enable another user to access a higher level of difficulty with respect to demonstrating how to decode a language by breaking the language down into components. Optionally, a fingerprint sensor may be used to identify the user, and based on that identification, determine what levels the user is authorized to access.

Figure 4A:
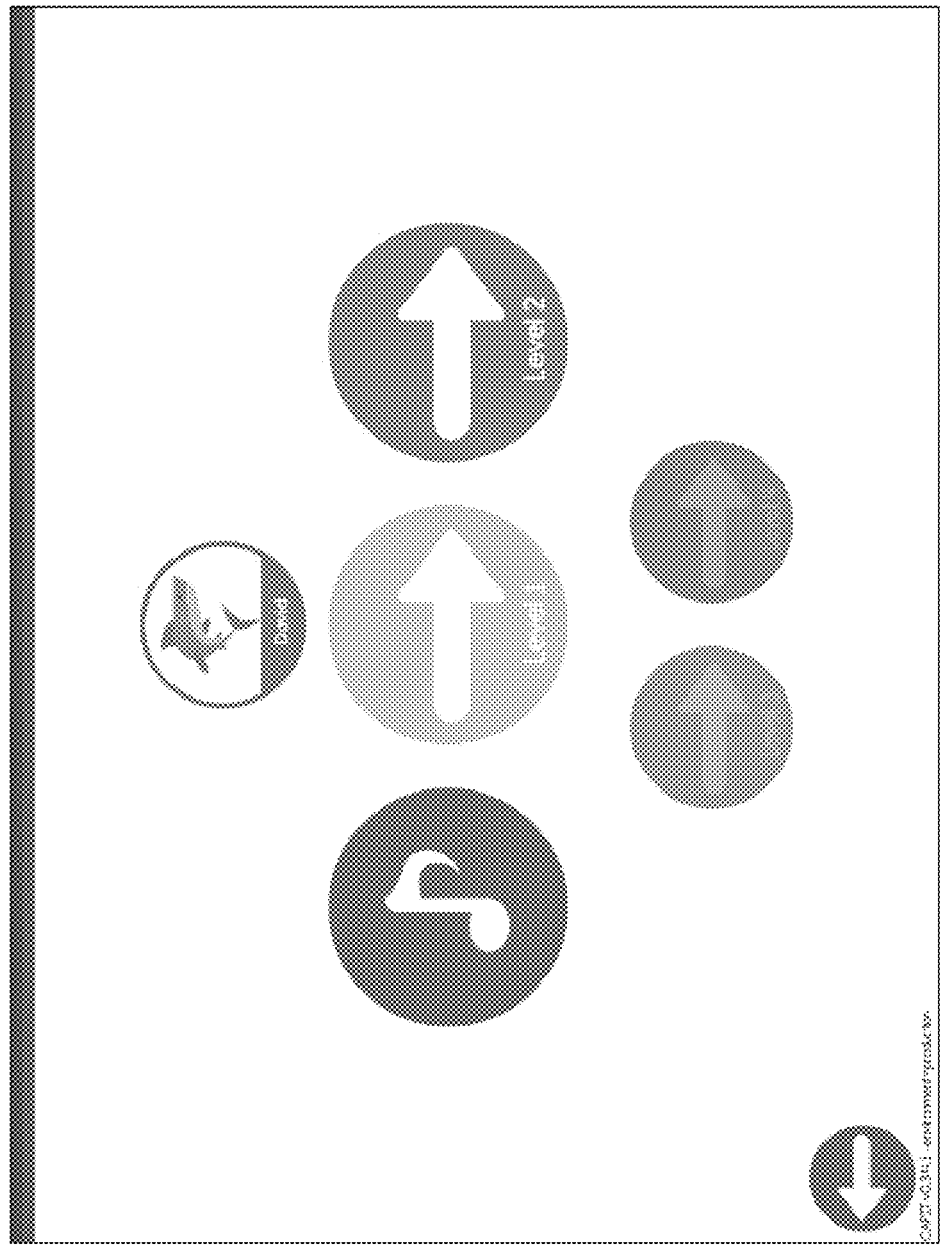
FIGS. 4A-4P illustrate example user interfaces corresponding to a second example process.

The following example user interfaces correspond to such a higher level of difficulty with respect to demonstrating how to decode a language by breaking the language down into components. As noted above, subsets of the following user interfaces may be combined with subsets of the previously described user interfaces. FIG. 4A illustrates an example user interface that enables a user to select from different levels of difficult (e.g., Level 1, Level 2, Level 3, Level 4, etc.). Once the user interface selects a level, an electronic card bank is displayed that may include a number of letters/sounds (where a given sound may be represented by more than one letter), wherein a given letter corresponds to a letter of the alphabet of the language and a given sound may correspond to a basic sound or phoneme of the language, as similarly described above. The user interface illustrated in FIG. 4B is similar to that illustrated in FIG. 3B. Referring to FIG. 4B, a pop-up window is generated and displayed. In this example, the pop-up window includes the selected letter (e.g., an uppercase "A") surrounded by a border (e.g., a broken circular border composed of dashes) and a graphic or photograph of an item that has a shape similar to that of the selected letter (e.g., an alligator head), and that is likewise surrounded by a border. A graphic (e.g., and arrow), text, animation, video, and/or voice instruction is provided indicating that the user is to drag the letter over the item (e.g., with the border of the letter overlaying the border of the item).

In response to detecting that the user has successfully touched the letter and dragged it with a finger over the item (e.g., as similarly discussed above), a confirmation sound may be generated (and/or optionally haptic feedback may be provided) and a subsequent user interface, an example of which is illustrated in FIG. 4C, is automatically presented or is presented in response to the user selected a "next" control (e.g., an arrow). For example, the user may need to drag the letter so that the border of the letter and the border of the item overlap within a specified threshold distance in order for the touch device to determine that the user has successfully dragged the letter over the item.

The user interface illustrated in FIG. 4C reproduces the selected letter, optionally using a larger font than used in the user interface illustrated in FIG. 4B. In addition, a voice reproduction or synthesis system included in the touch device generates a sound corresponding to the letter (e.g., "ahh"), a name of the item (e.g., alligator), and/or a phrase that combines the sound with the name of the item (e.g., "ahh as in alligator"). In response to the user activating a "next" control or automatically, an example user interface may be presented that includes a "play" control. In response to detecting that the user has activated the "play" control, the touch device may play an animation or video. The graphic (or video) may dynamically illustrate a task that the user is to perform. For example, the puzzle pieces corresponding to the item illustrated in FIG. 4B may be presented (e.g., a puzzle piece corresponding an alligator muzzle, a puzzle piece corresponding the alligator eyes, and a puzzle piece corresponding the alligator teeth) in addition to an outline of the item (e.g., a broken outline formed of dashes) and the selected letter.

The user interface illustrated in FIG. 4D1 may be presented. As illustrated in FIG. 4D1, the puzzle pieces corresponding to the item illustrated in FIG. 4B may be presented (e.g., a puzzle piece corresponding an alligator muzzle, a puzzle piece corresponding to the alligator eyes, and a puzzle piece corresponding the alligator teeth) in addition to an outline of the item (e.g., a broken outline formed of dashes) and the selected letter. The user is to drag and drop the various pieces to the appropriate locations within the item outline. Optionally, the puzzle pieces are at a fixed orientation to reduce the complexity of the dragging operation. That is, the user does not have to rotate puzzle piece to a correct orientation prior to or after dragging the puzzle piece to the correction location. However, optionally the puzzle pieces are not at a fixed orientation, and the user needs to orient a given puzzle piece to the correct orientation prior to or after dragging the puzzle piece to the correction location.

The user may need to drag a given puzzle piece so that the puzzle piece is within a specified threshold distance of its designated location in order for the touch device to determine that the user has successfully dragged the puzzle piece to the correct location. If the application detects that the user has dragged the puzzle piece to within the specified threshold distance of its designated location, then the application may snap to the puzzle piece to its proper location (e.g., so that the puzzle piece is fully within its designated location at the correct orientation) and generate an audible confirmation sound (and/or optionally haptic feedback may be provided). If the application detects that the user has not dragged the puzzle piece to within the specified threshold distance of its designated location, then the application may allow the puzzle piece to remain at the location the user dropped it at without providing a confirmation sound and without snapping the puzzle piece to its proper location.

Optionally, if the user begins dragging a puzzle piece and then releases the puzzle piece, the application may cause the puzzle piece to continue moving along the same trajectory and optionally velocity and/or acceleration the puzzle piece had prior to the release. Optionally, the application may cause the velocity and/or acceleration of the puzzle piece to degrade until the puzzle piece stops. Optionally, depending on the position, trajectory, and velocity and/or acceleration of the puzzle piece prior to release, the application may cause the puzzle piece to bounce off one or more of the user interface walls until the velocity decays to that the movement of the puzzle piece stops. In response to determining that the user has correctly assembled the puzzle at the correct location, the letter may then be displayed by the user interface, wherein the letter has a size and shape as the assembled puzzle. The user is to drag the letter over the assembled puzzle as illustrated in FIG. 4D2. In response to detecting that the user has dragged the letter over the assembled puzzle, the "next" control (e.g., an arrow), may be activated and displayed.

Figure 4E:
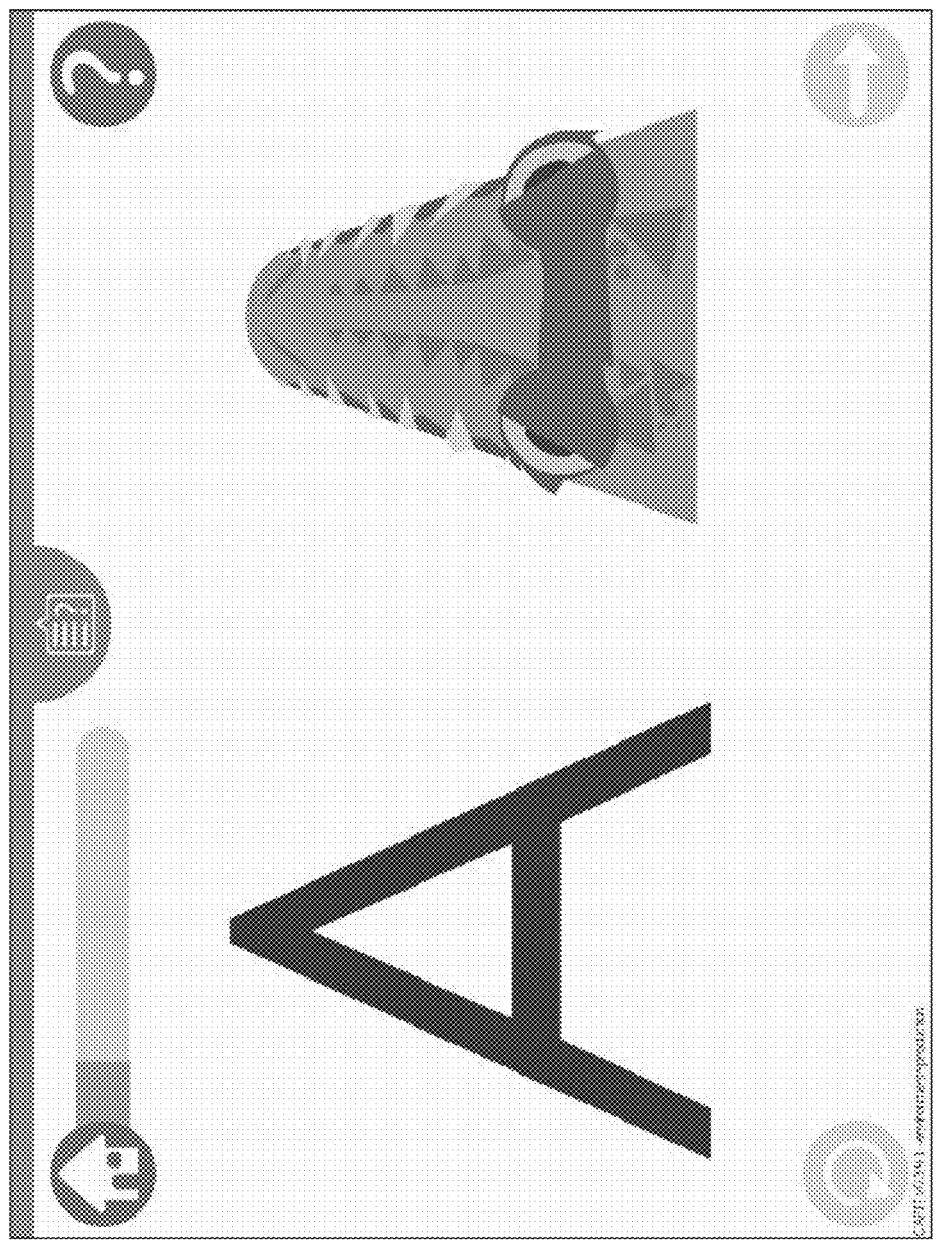

In response to the user activating a "next" control or automatically, the example user interface illustrated in FIG. 4E may be presented. The example user interface illustrates the letter and the item. The touch device plays a song that includes the sound of the letter and the name of the item ("the alligator sound says "aah, aah, aah"), and moves that letter and item towards each other until the letter overlays the item. In response to the user activating a "next" control or automatically, the example user interface illustrated in FIG. 4F may be presented.

The example user interfaces illustrated in FIG. 4F-4I, are configured to instruct and train the user in how to draw the symbol letter. Each user interface may be progressively more challenging than the previous user interface to further reinforce the letter writing process. For example, in the example user interface illustrated in FIG. 4F, the outline of the letter may be presented overlaying the item (e.g., the alligator head), where the item may act as a mnemonic. Arrows (which may be straight and/or curved lines) may be presented within respective segments (which may be straight and/or curved line segments) of the letter, where the user is to trace the respective segments in the arrow directions to a specific extent, in a specific order so as to draw the letter. The first arrow to be traced may be emphasized relative to the other arrows.

For example, the first arrow to be traced may be colored (e.g., colored white), while the other arrows may be translucent so that the item beneath may be viewed. In addition, the base portion of first arrow may be highlighted (e.g., via a blinking dot, via a solid color, or otherwise), wherein the user is to trace the arrow whose base is highlighted from the base to the arrowhead.

The application detects if the user has correctly drawn/traced the first line segment (e.g., by touching a base portion of the arrow with a finger and dragging the finger to an arrowhead portion of the arrow). For example, the user input may be converted to a vector with a start and end point (or a start point, direction, and length). The application may compare the vector and start point to a reference vector, and if the application determines certain vector characteristics (e.g., magnitude and/or direction) are within the corresponding threshold of the reference vector characteristics, the application may determine that the user correctly traced the first line segment. If the application determines that one or more of the vector characteristics are outside a threshold of the corresponding reference vector characteristic, the application may determine that the user incorrectly traced the first line segment. Thus, the use of vectors and thresholds may be used to determine whether an ambiguous user entry corresponds to a correctly performed task.

The application may fill in the corresponding portion of the letter outline (e.g., using a colored line that appears it was drawn using a marker or crayon, where the line may be irregular as if it where hand drawn) as the user drags the user's finger to provide feedback indicating the user is correctly performing the task. If the application detects that the user has not fully traced the arrow in the correct direction, the application may cause the portion that was colored while the user was finger dragging to revert back to its previous color.

In response to detecting that the user has correctly dragged the user's finger over the full extent of the arrow in the correct direction, the application may highlight (e.g., by coloring using a different color and width than was used during the finger dragging task) another arrow within a different segment of the letter. In addition, the base portion of the different arrow may be highlighted (e.g., via a blinking dot, via a solid color, or otherwise), wherein the user is to trace the arrow whose base is highlighted from the base to the arrowhead. The foregoing process repeats for each letter segment until the application determines that the user has correctly drawn the letter with the user's finger (or stylus), and a completion indicator may be provided. For example, a series of white circles may be presented, with one circle for each letter drawing user interface (e.g., four indicators in this example).

If the user attempts to draw a segment in the wrong order and/or the wrong direction, optionally the application will not fill in the segment.

Figure 4F:
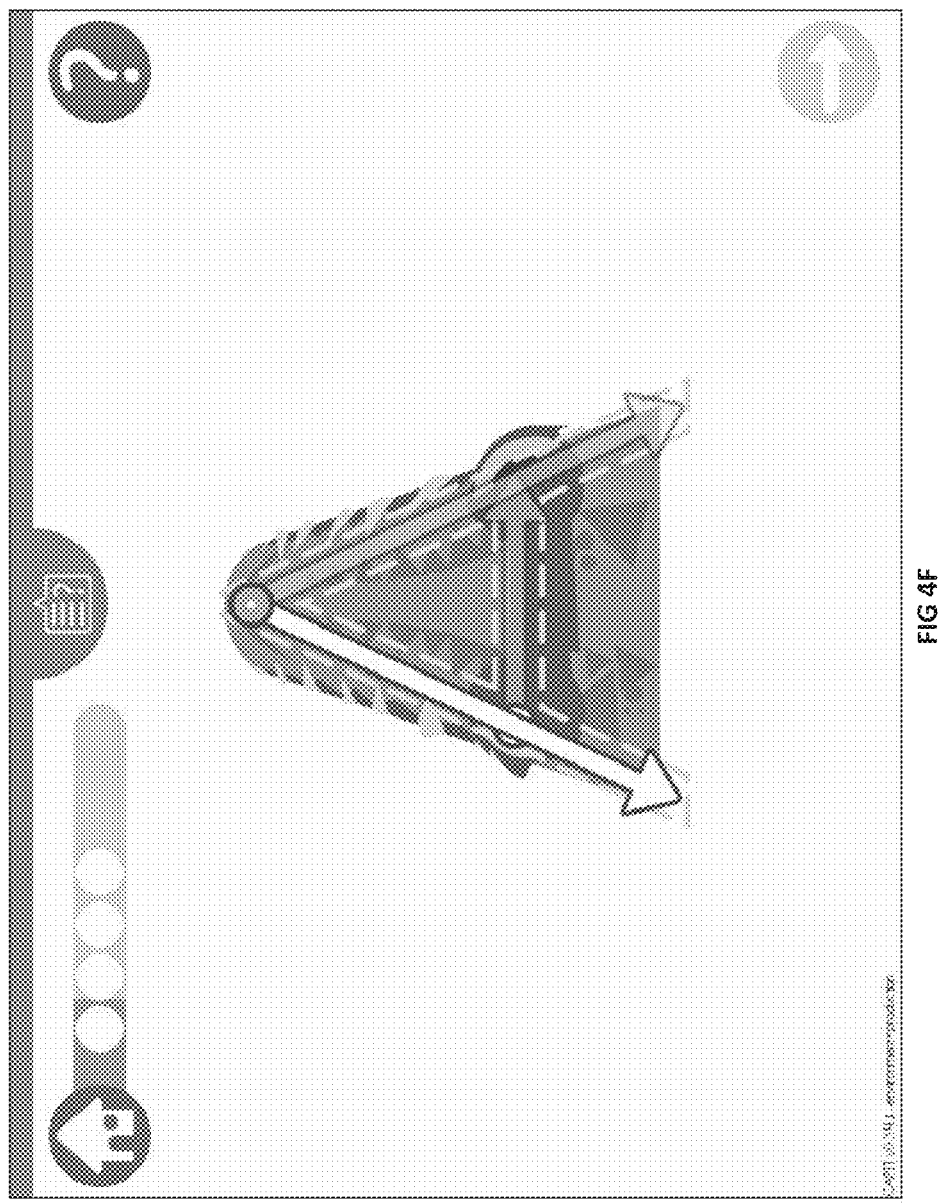

Once the application determines that user has successfully drawn the letter via the user interface illustrated in FIG. 4F, the user interface illustrated in FIG. 4G may be presented. The process described above with respect to FIG. 4F may be repeated, except that while the outline of the letter is presented with arrows in respective letter line segments, the item (e.g., the alligator head), may not be displayed, and all the non-emphasized arrows for the respective letter segments may be greyed out. The application may cause the base portion of a given arrow that is to be traced to be highlighted (e.g., via a blinking dot, via a solid color, or otherwise). Again, if the user attempts to draw a segment in the wrong order and/or the wrong direction, optionally the application will not fill in the segment.

Once the application determines that user has successfully drawn the letter via the user interface illustrated in FIG. 4G, a user interface may be presented that includes the arrows but not the outline of the letter. As similarly discussed above, the application may cause the base portion of a given arrow that is to be traced to be highlighted (e.g., via a blinking dot, via a solid color, or otherwise). Again, if the user attempts to trace an arrow in the wrong order and/or the wrong direction, optionally the application will not fill in the arrow.

Once the user sufficiently draws the letter via the user interface discussed above, the user interface illustrated in FIG. 4H may be presented. In this example, the letter outline is presented, but the arrows are not presented. Thus, the letter shape appears as it would typically when used in written material. Start point indicators may be provided corresponding to the base of the arrows presented in FIG. 4F. The start point indicator of the line segment that the user is to trace next may be emphasized (e.g., via a blinking dot) indicating the beginning point of a line segment to be drawn by the user. Once the user successfully draws the line segment, the next start point indicator is highlighted. Again, if the user attempts to draw a segment in the wrong order and/or the wrong direction, optionally the application will not fill in the segment. Optionally, an interface is provided via which an administrator may share final letter as drawn by the user (e.g., via email, an application, a website, an MMS message or otherwise) with one or more destinations (e.g., a parent).

Figure 4H:
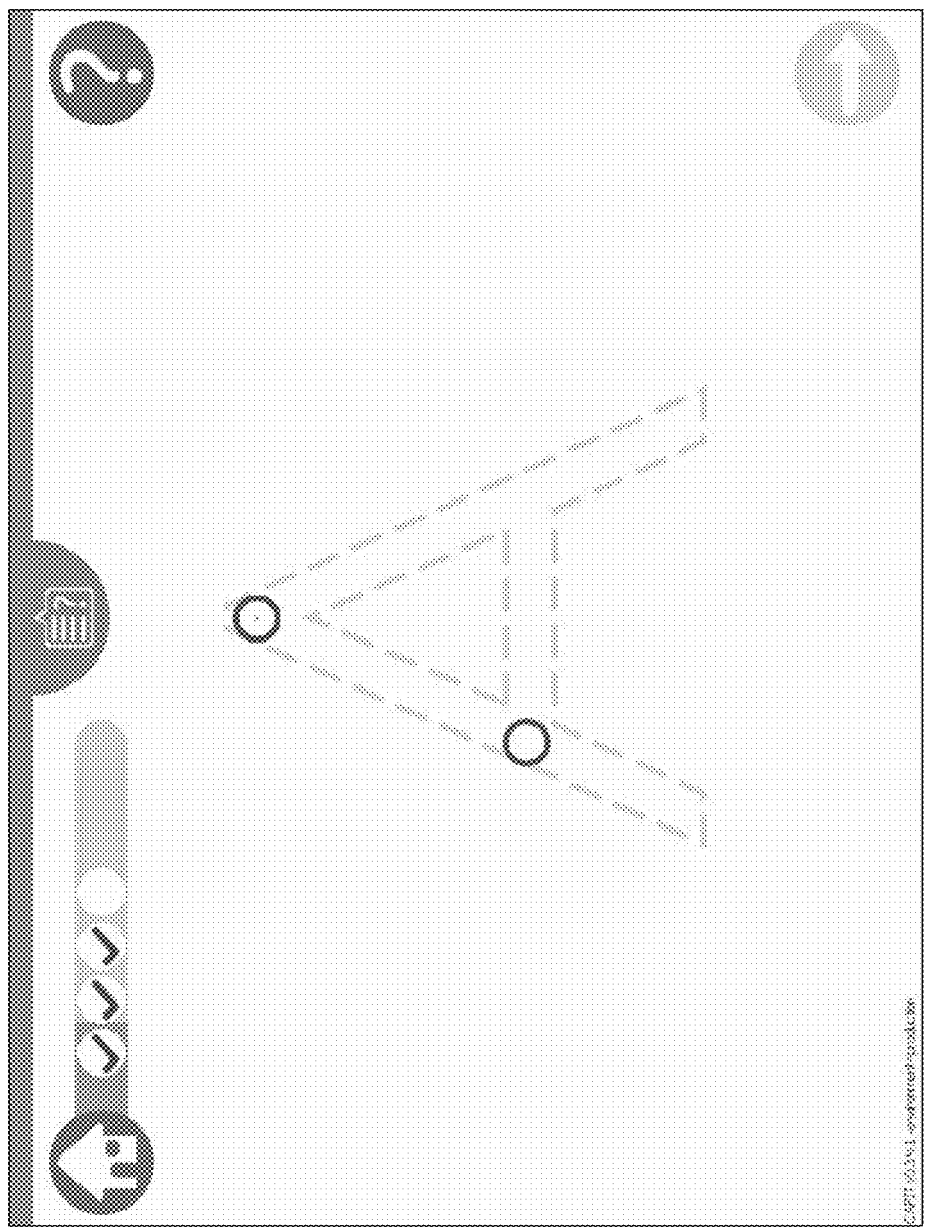
Figure 41:
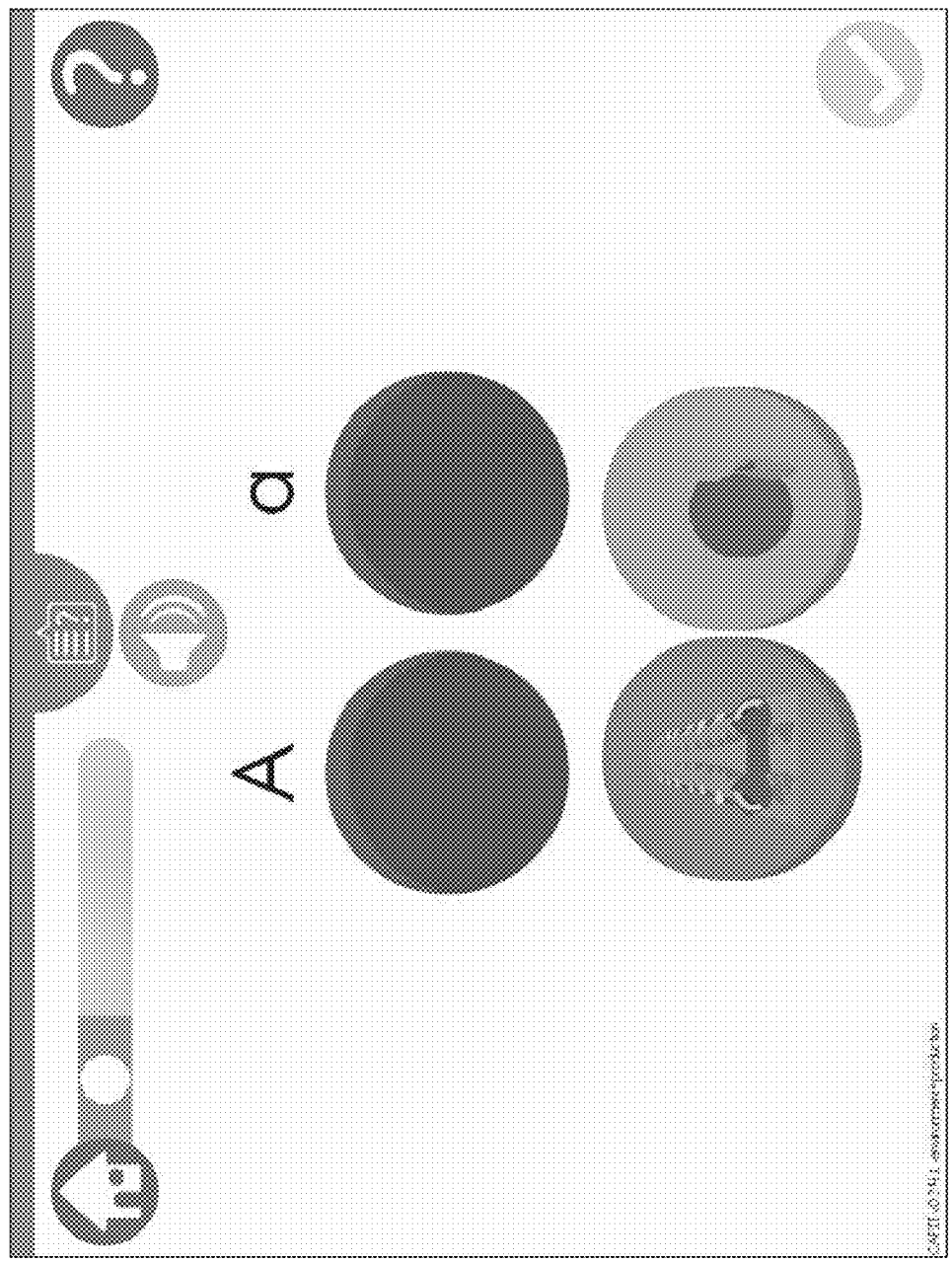

Once the user has successfully drawn the letter via the user interface illustrated in FIG. 4H, the user interface in FIG. 4I is presented. The user interface of FIG. 4I presents the letter in both lowercase (e.g., "a") and uppercase (e.g., "A"). Beneath each is a geometric shape (e.g., a circle), and beneath each circle is an image of an item corresponding to either the lower or uppercase letter (an apple and an alligator head) in respective circles (or other geometric shapes). However, the items may optionally be switched, so that the item corresponding to the lowercase letter (e.g., the apple) is located below the uppercase letter, and so that the item corresponding to the uppercase letter (e.g., the alligator) is located below the lowercase letter. The user is to drag each item into the circle beneath the corresponding version of the letter. Once the application detects that the user has sufficiently dragged the items into the respective circles (optionally with the correct orientation/rotation), the application may snap the items so that they are centered within the corresponding circles, a confirmation sound may be generated (and/or optionally haptic feedback may be provided), and the "next" control may be presented/enabled.

Figure 4J:
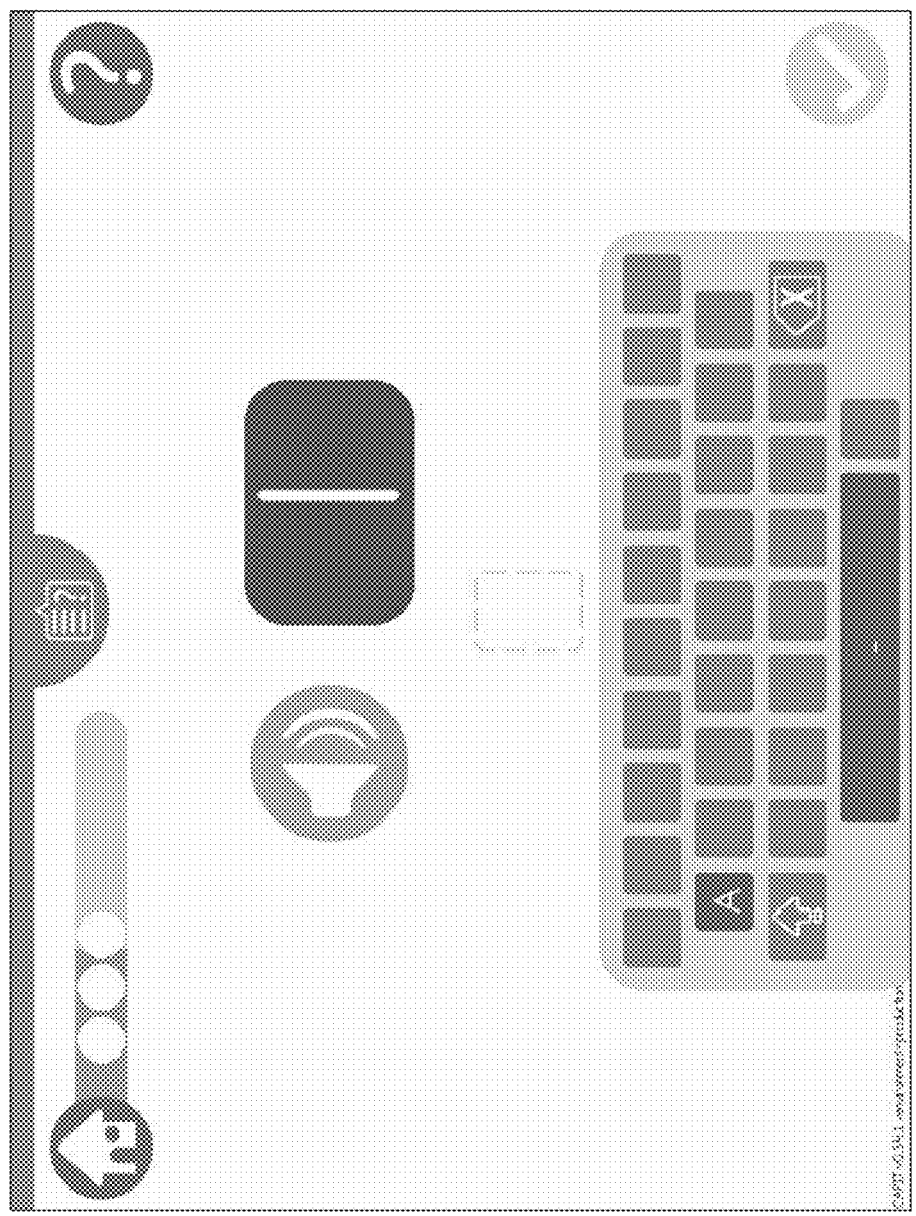

In response to the user activating the next control or automatically, the example user interface illustrated in FIG. 4J may be presented and the letter sound ("aah") may be generated. The user interface includes a keyboard, a sound generation control (which when touched causes the letter sound to be generated), and a letter field. The keyboard letter keys may be blank, except for that of the letter being taught (e.g., "a") and one other letter (or other number of other letters). When the keyboard is displayed, the sound corresponding to the letter being taught may automatically be played (e.g., "aah"). The user is to select, via touch, a keyboard key corresponding to the letter. In response to the user touching a letter key, the corresponding letter may be displayed in the letter field. If the user correctly touches the letter key of the letter being taught, the letter is displayed in the letter field and the application provides a visual confirmation feedback indicator (e.g., a checkmark) and/or an audible confirmation indicator (and/or optionally haptic feedback may be provided). In addition, an electronic card may be displayed that includes the letter. If the user touches an incorrect letter key, the letter is optionally displayed in the letter field in a greyed out fashion (or other indicator may be provided indicating the incorrect key selection), and instead of a visual confirmation feedback indicator (e.g., a checkmark) and/or an audible confirmation indicator being provided, a visual failure feedback indicator (e.g., an "X") and/or audible failure indicator (and/or optionally haptic feedback) may be provided.

Figure 4K:
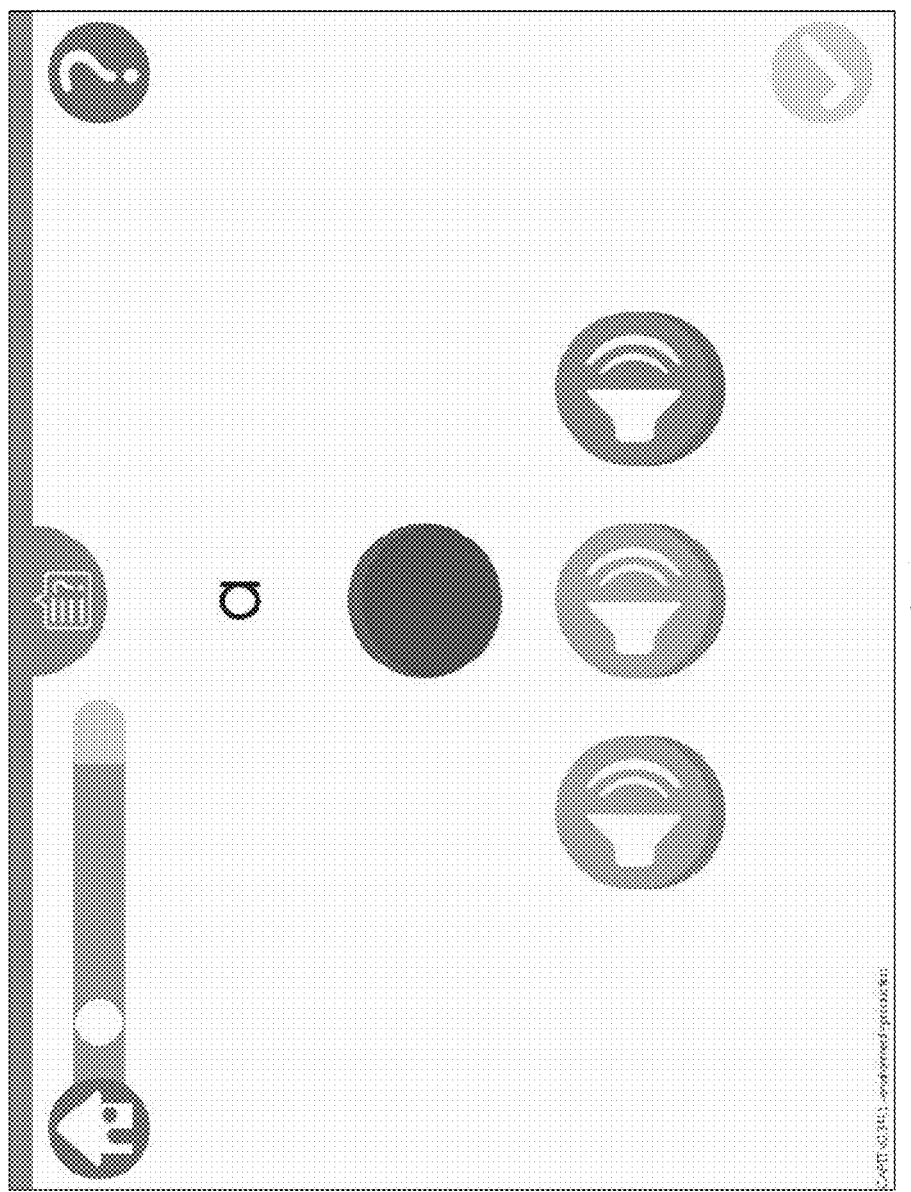

If the user correctly selected the correct letter via the keyboard illustrated in FIG. 4J, then in response to the user activating the next control or automatically, the example user interface illustrated in FIG. 4K may be presented. The user interface illustrated in FIG. 4K displays the letter (e.g., "a"), a target field, and a plurality of sound controls (e.g., speaker icons of different colors). In response to the user selected a given sound control, touch device generates a sound. The user is to drag the sound control corresponding to the letter to the target field (e.g., a geometric shape, such as a circle). At least partly in response to detecting that the user has dragged the corrected sound control to the target field, the application provides a visual confirmation feedback indicator (e.g., a checkmark) and/or an audible confirmation indicator.

Figure 4L:
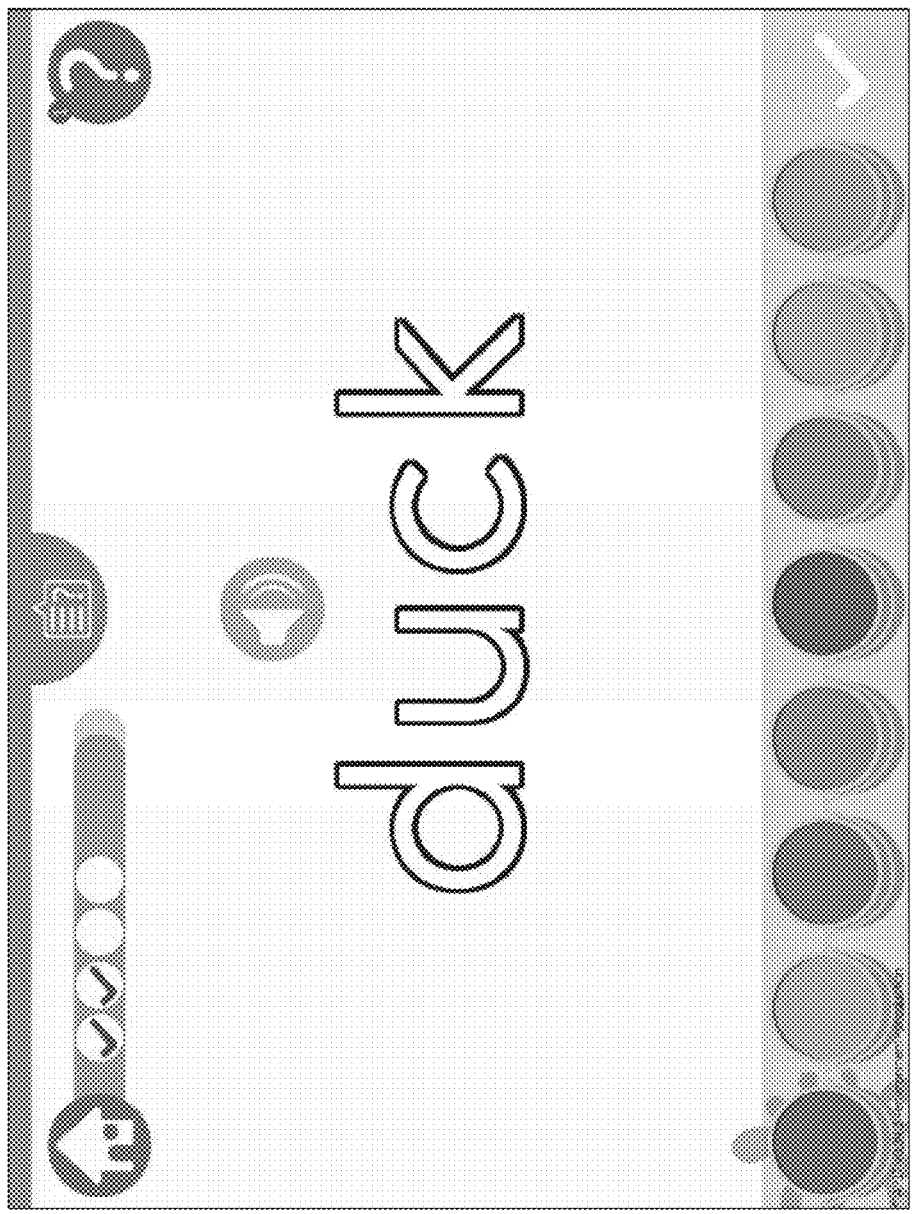
Figure 4M:
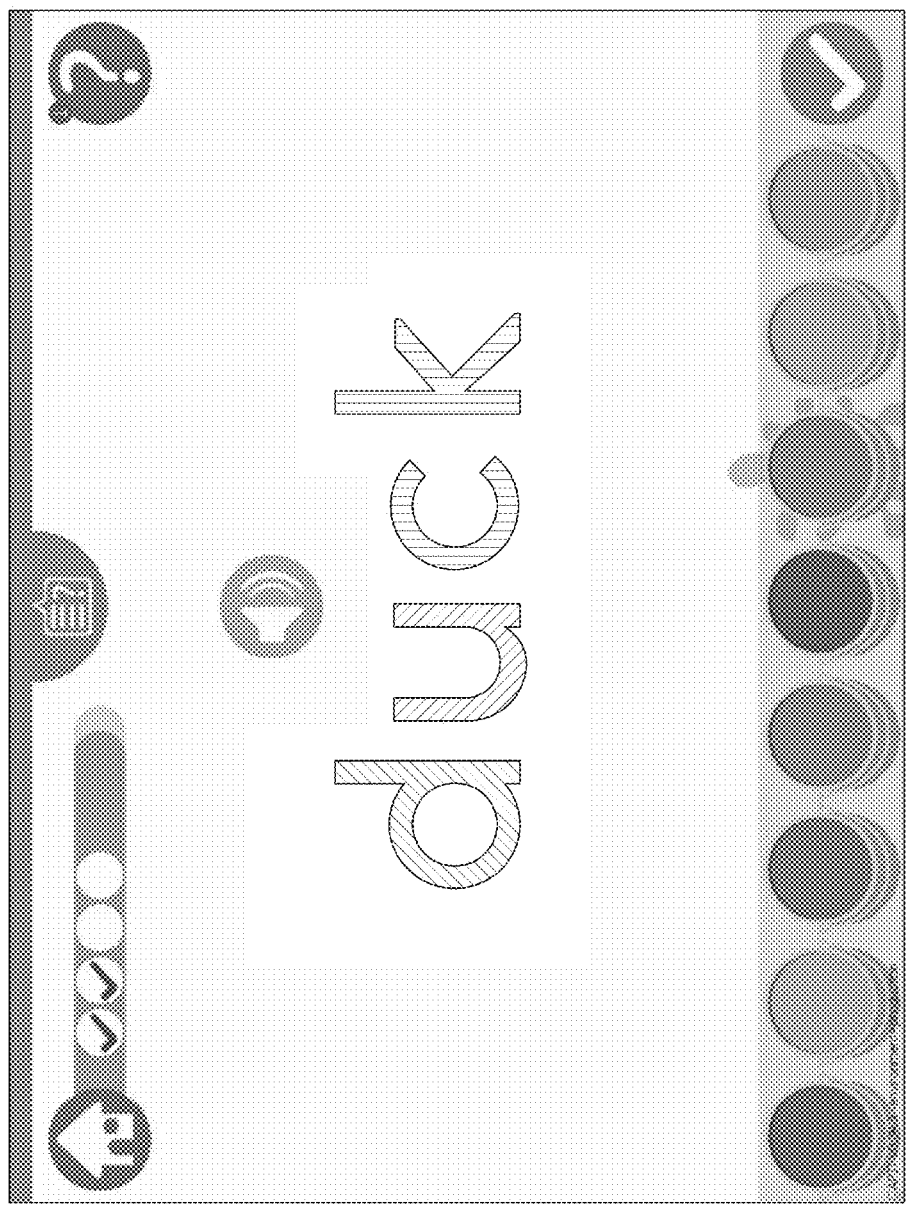

Referring now to FIGS. 4L-4M, example user interfaces are presented via which the user is to paint letters corresponding to a given sound in the same color. For example, the word "duck", which has four letters, is composed of only three sounds, represented by the following spellings: "d", "u" and "ck". Therefore, the user is to paint/fill in the letter "d" with a first color, the letter "u" with a second color, and the letter combination "ck" with a third color. These user interfaces further reinforce and test the user's knowledge with respect to phonemes and the spellings associated with the phonemes.

Referring to the example user interface illustrated in FIG. 4L, the user interface includes a word ("duck") in stencil/ outlined form, different color digital "paints" in graphic buckets, and a sound control (e.g., in the form of a speaker graphic). Upon the detection of the sound control, the word ("duck") and/or phonemes thereof ("d", "u", "ck") may be enunciated. The user interface enables the user to select a paint color by touching the corresponding paint, then paint/fill-in a given letter using the selected paint. FIG. 4M illustrates the example user interface of FIG. 4L with the letters correctly painted (e.g., the letter "d" is painted a first color, the letter "u" is painted a second color, and the letters "ck" are painted a third color). The application provides a visual confirmation feedback indicator (e.g., a checkmark or a highlighted checkmark) and/or an audible confirmation indicator (and/or optionally haptic feedback may be provided) if the user correctly painted the letters to indicate the different sounds included in the illustrated word. If the user did not correctly paint the letters to indicate the different sounds included in the illustrated word (e.g., the user painted the letter "d" a first color, the letter "u" a second color, the letter "c" a third color, and the letter "d" a fourth color), the application may provide a negative feedback indicator (e.g., not displaying a checkmark or displaying the checkmark in a greyed our manner) and/or an audible fault indicator, and optionally the user may be prevented from accessing the next task user interface.

Figure 4N:
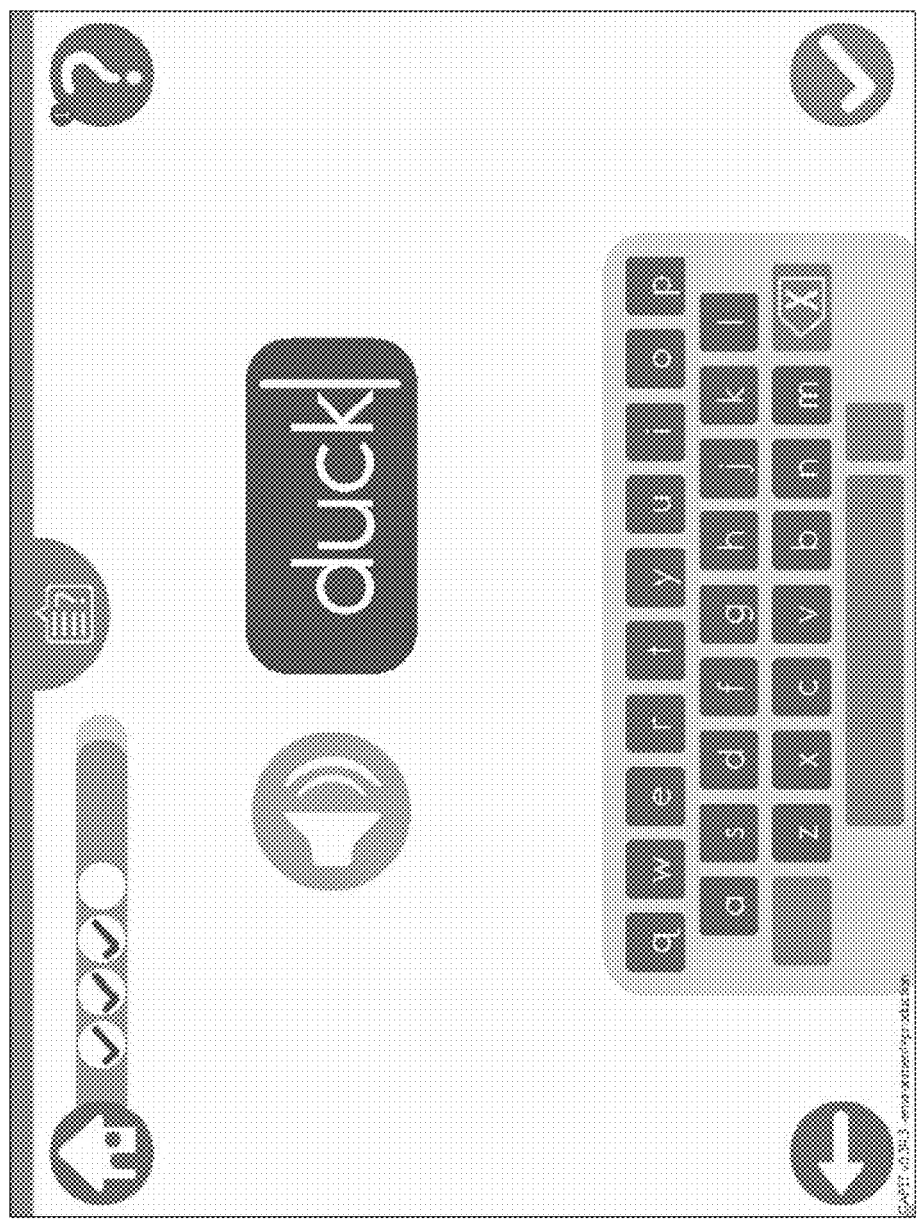

If the user did correctly paint the letters to indicate the different sounds included in the illustrated word a subsequent user interface, an example of which is illustrated in FIG. 4N, is automatically presented or is presented in response to the user selected a "next" control (e.g., an arrow). The user interface includes a keyboard, a sound generation control (which when touched causes the letter sound to be generated), and a word field. When the keyboard is displayed, the word and/or the phonemes that make up the word may automatically be enunciated. The user is to spell the word by touching corresponding keyboard keys. In response to the user touching a letter key, the corresponding letter may be displayed in the letter field. If the user correctly types in the word being taught, the application provides a visual confirmation feedback indicator (e.g., a checkmark) and/or an audible confirmation indicator (and/or optionally haptic feedback may be provided). If the user does not correctly type in the word, the letters typed in by the user are optionally displayed in the word field in a greyed our fashion (or other failure indicator may be provided), and instead of a visual confirmation feedback indicator (e.g., a checkmark) and/or an audible confirmation indicator being provided, a visual failure feedback indicator (e.g., an "X") and/or audible failure indicator (and/or optionally haptic feedback) may be provided. A navigation control may be provided that enables the user to navigate to the user interface illustrated in FIGS. 4M, 4N so that the user can view the word again.

As discussed elsewhere herein, a pocket chart may be generated that includes the letters/sounds mastered by or taught to the user. A graphic card may be displayed for each letter/sound, which includes the letter or sound spelling, and which further includes a corresponding mnemonic graphic. The user may select a given letter or sound spelling, and additional corresponding information will be presented. The pocket chart may be accessed via a given interface by selecting a pocket chart access control. FIG. 4O illustrates an example pocket chart. In this example, the user has selected the letter lowercase "a". The user interface displays the selected letter/spelling, the corresponding mnemonic graphic (e.g., an apple for "a"), and displays spellings of sounds (e.g., "a", "A") that correspond to the selected letter. Optionally, the various sounds may be automatically enunciated in response to the user selecting the letter or in response to the user activating a sound control (e.g., a speaker icon). Although in this example, the pocket chart may display all 46 sounds, if the user has mastered fewer sounds, then the pocket chart may optionally include only those fewer sounds.

Figure 4P:
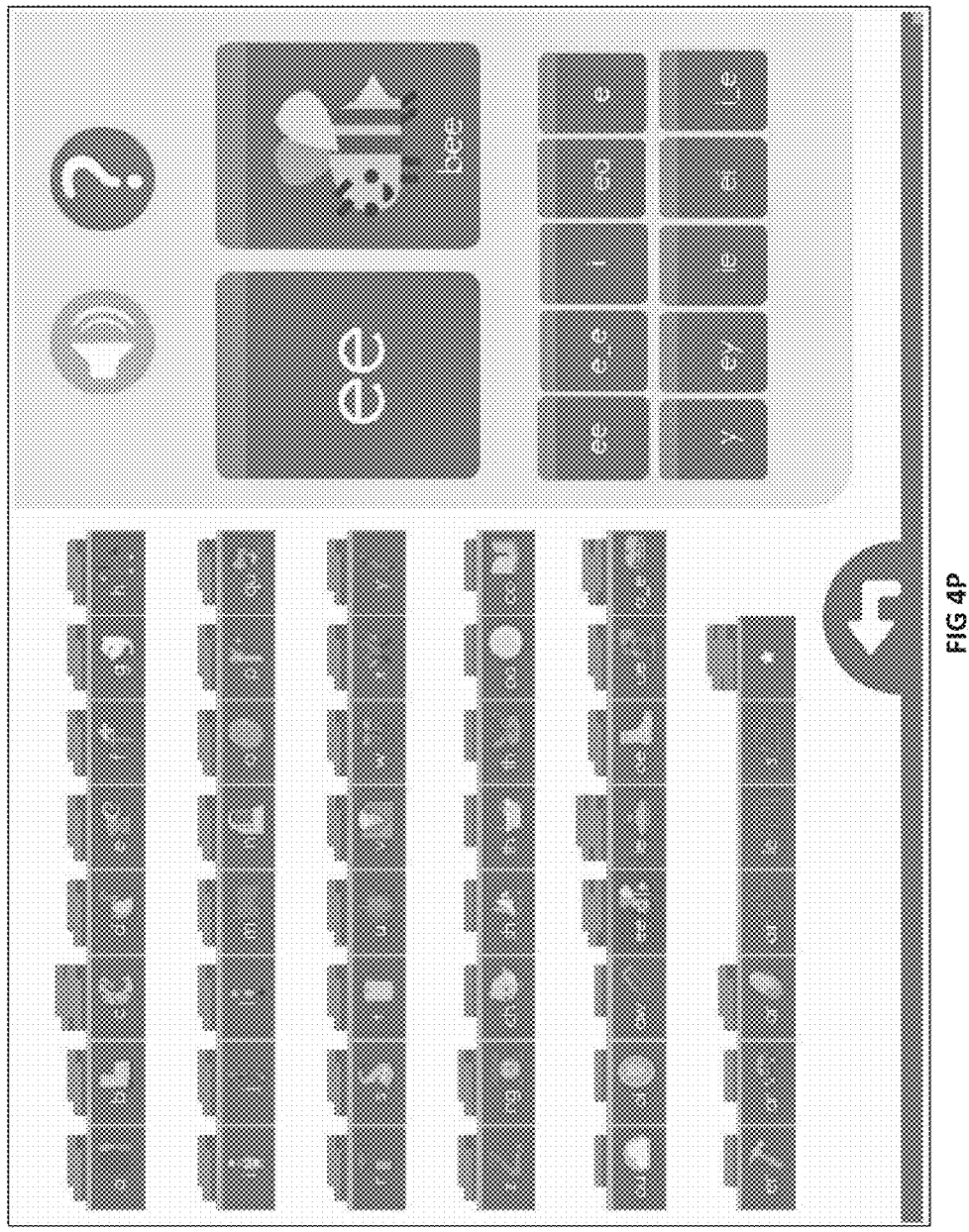
Figure 5A:
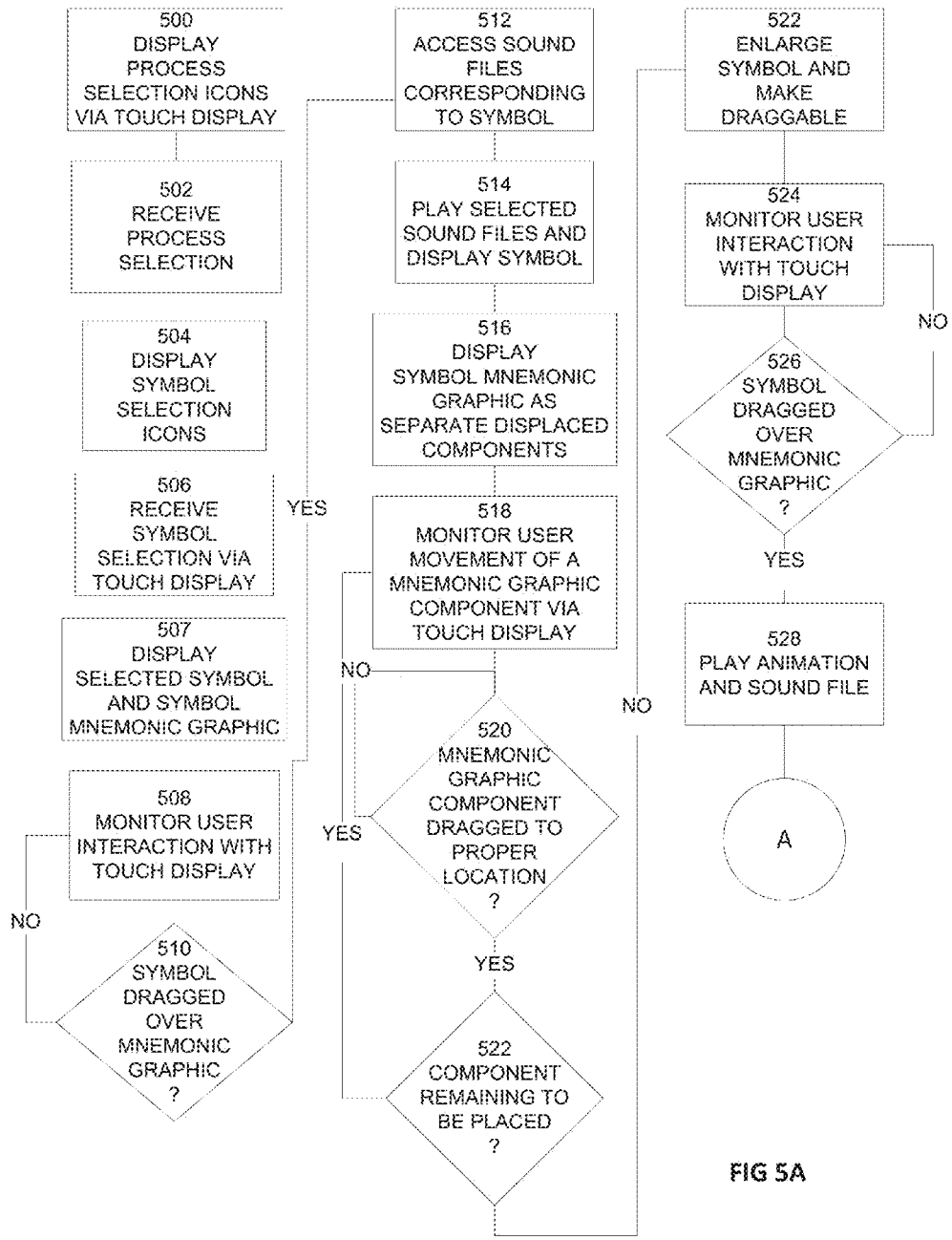
FIGS. 5A-5G illustrate example processes.
Figure 5B:
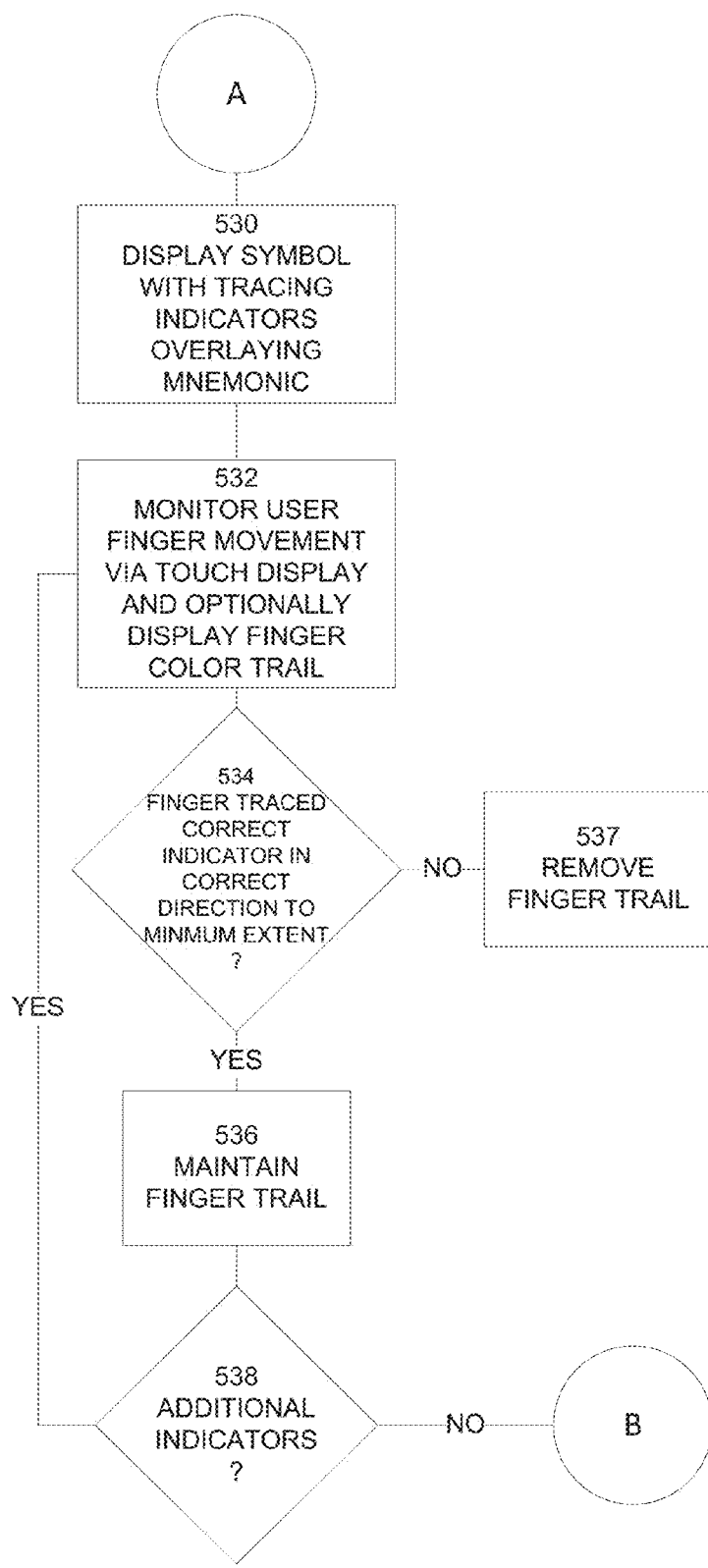
Figure 5C:
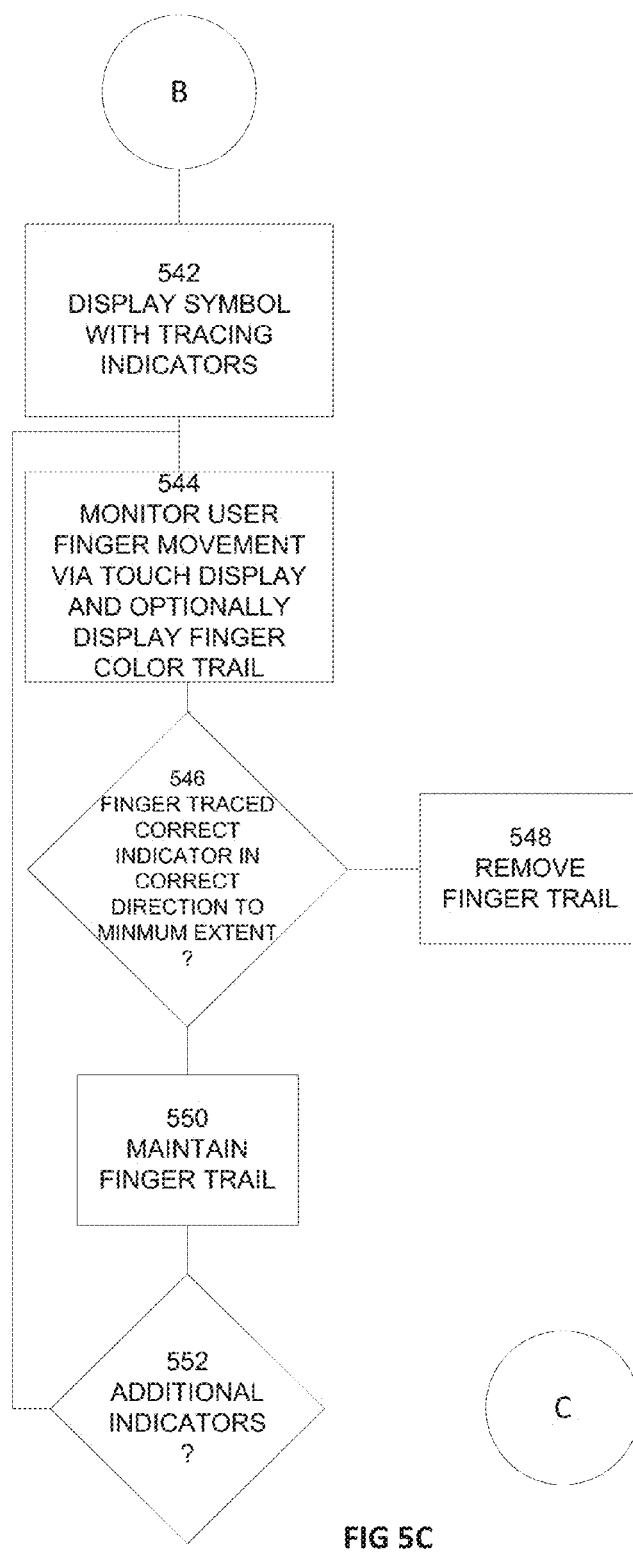
Figure 5D:
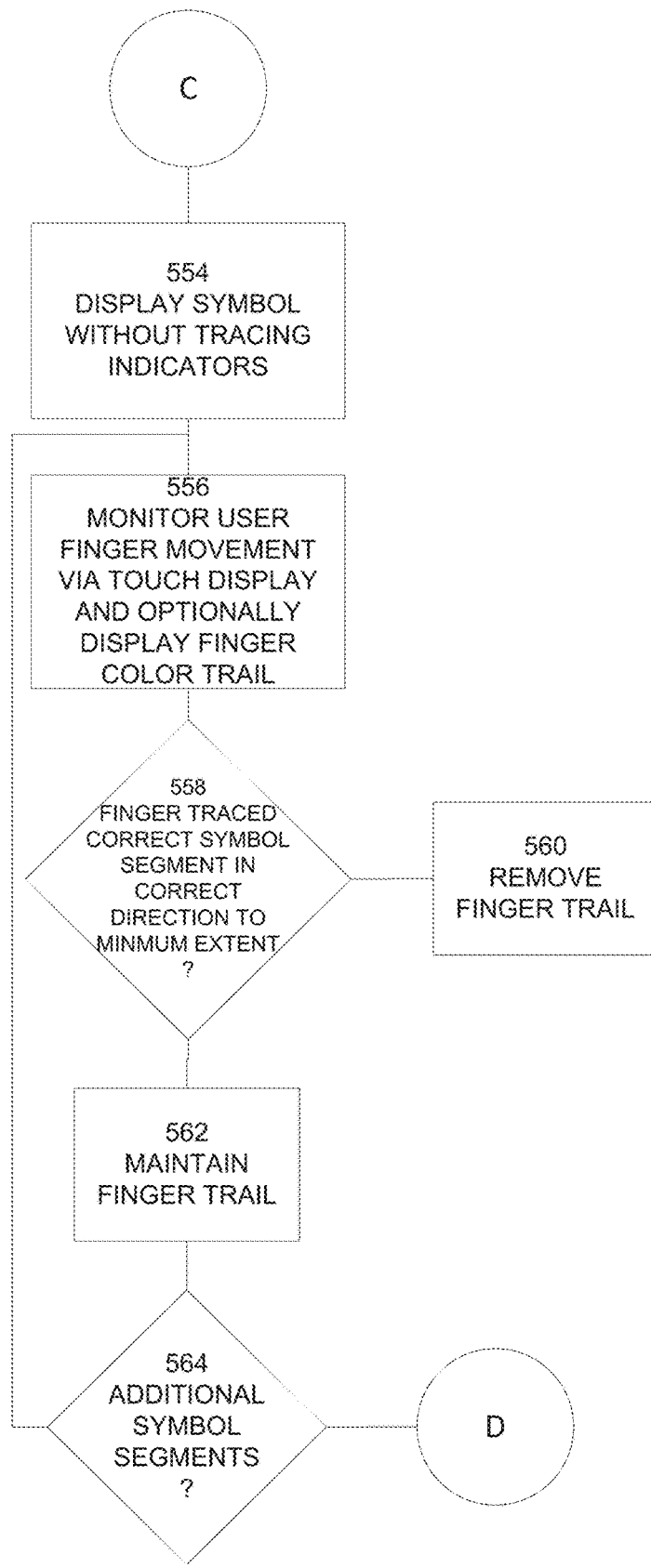
Figure 5E:
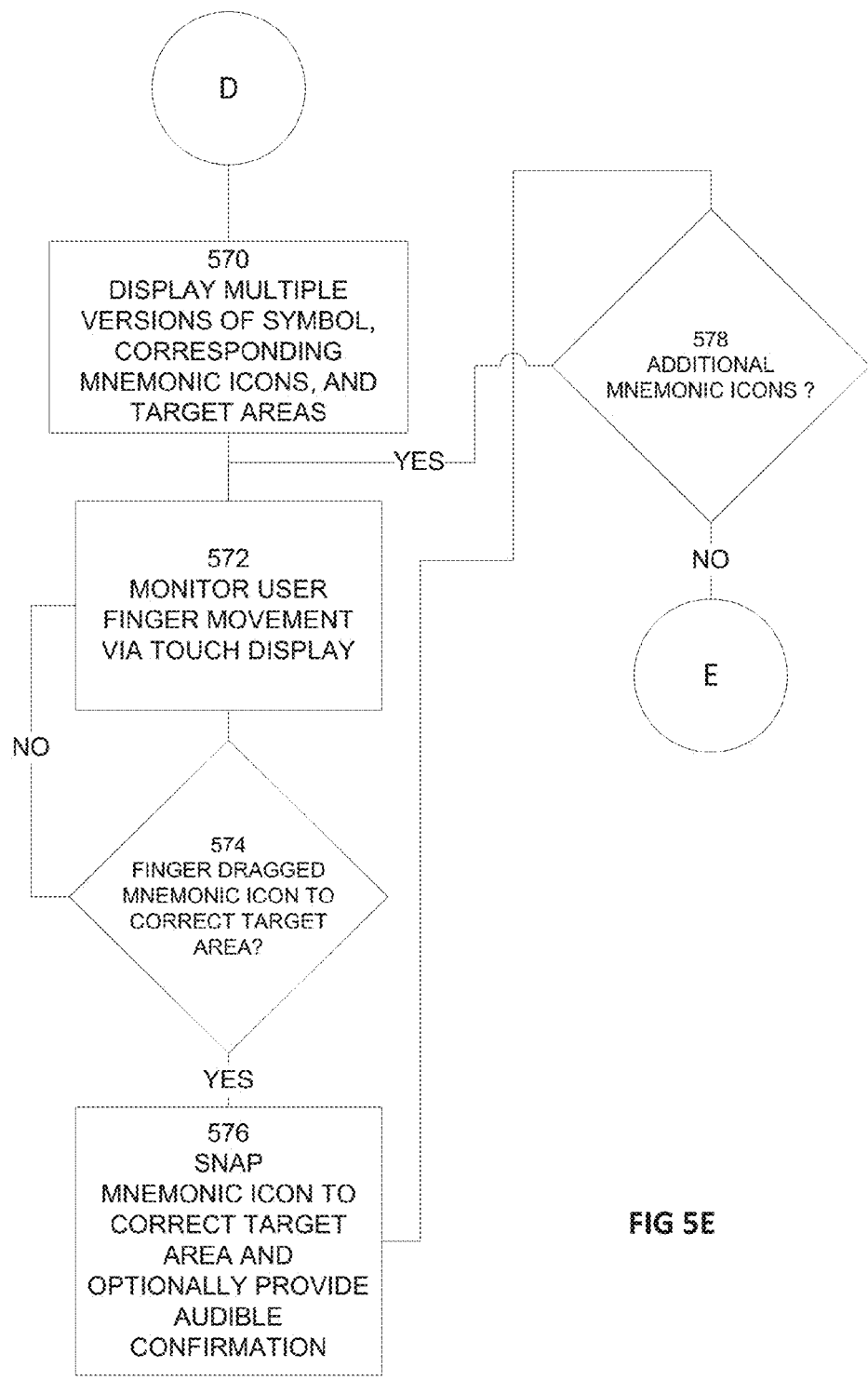
Figure 5F:
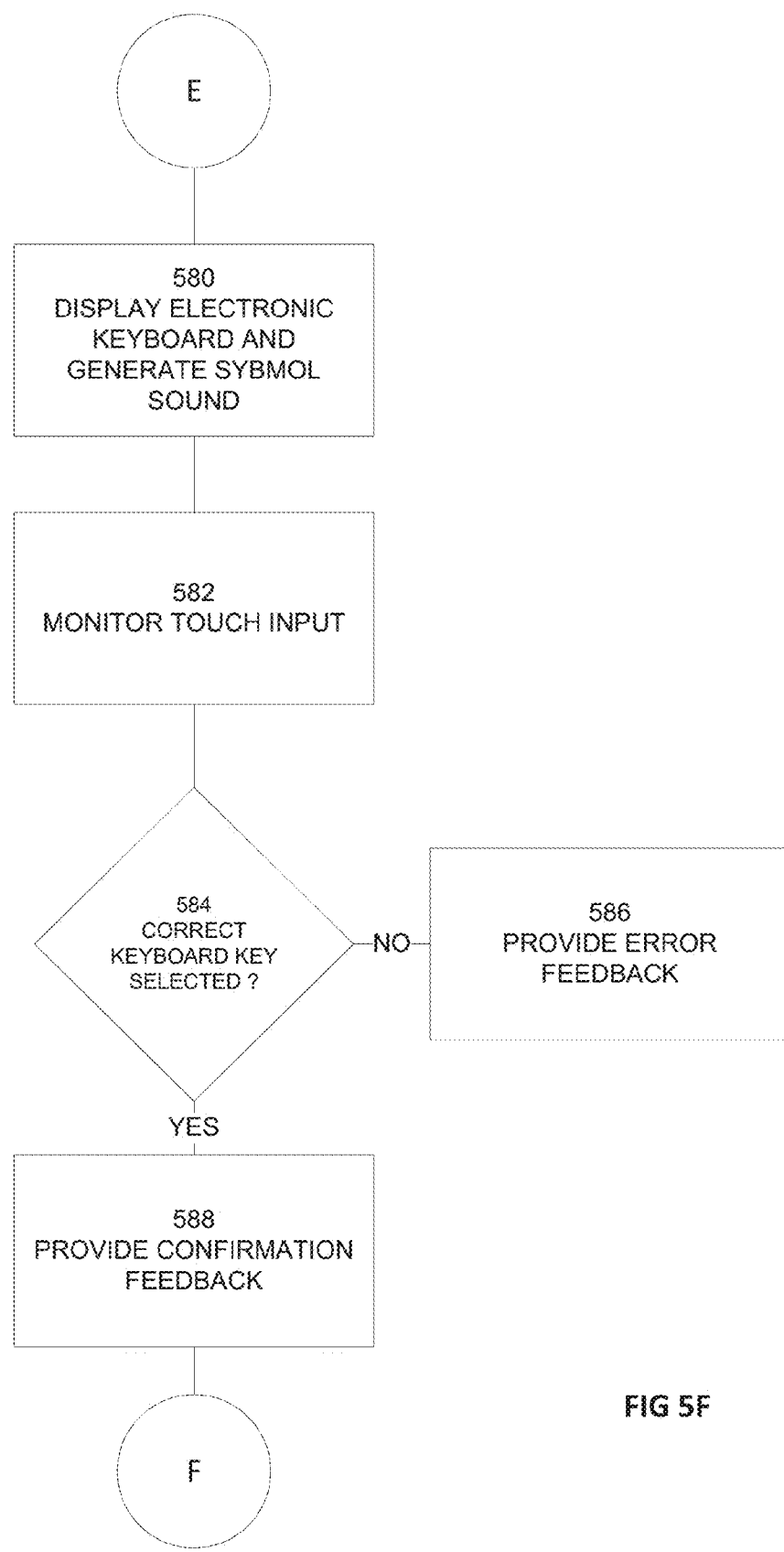
Figure 5G:
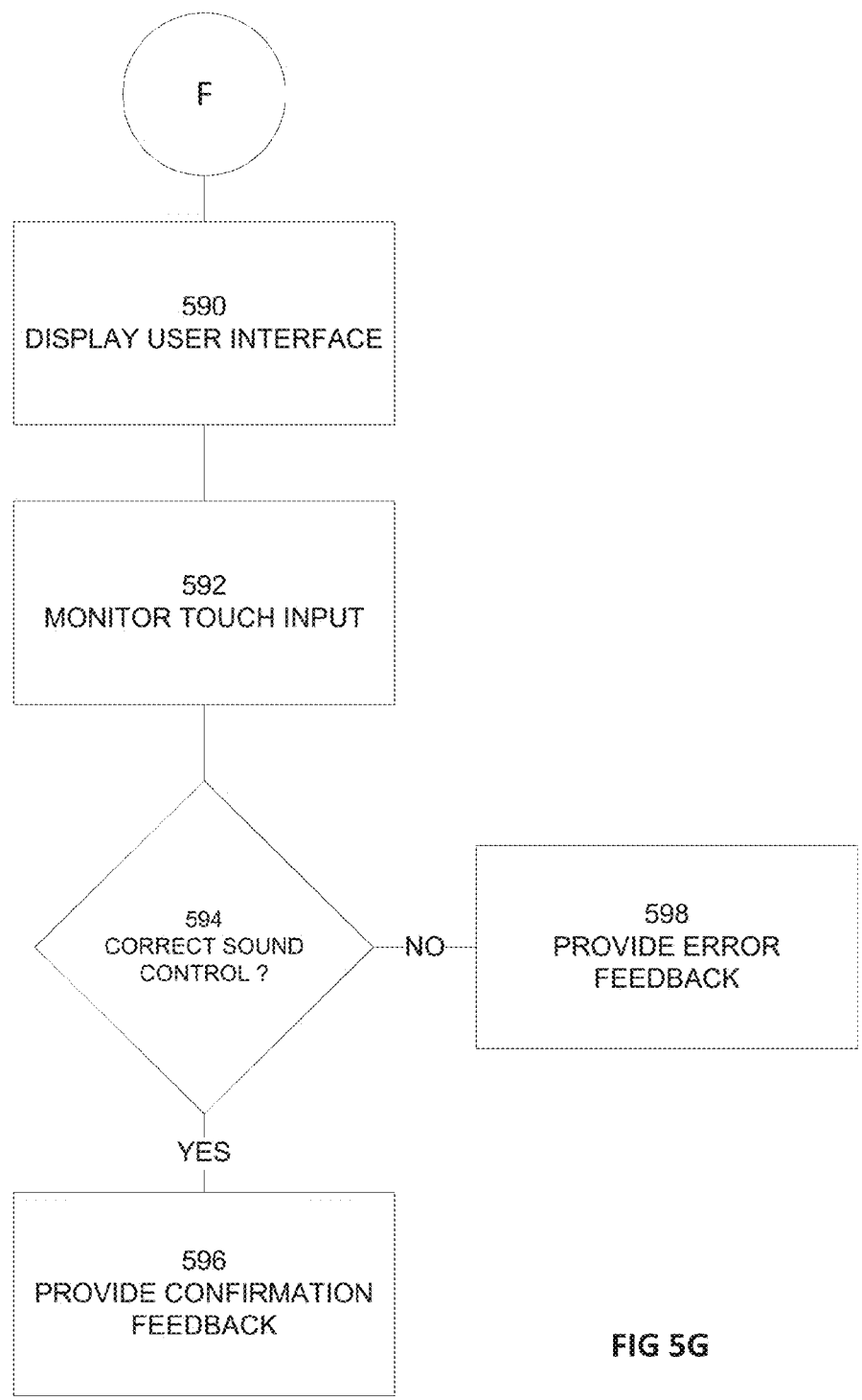

FIG. 4P illustrates another example pocket chart. In this example, the user has selected the spelling "ee". The user interface displays the selected sound spelling, the corresponding mnemonic graphic (e.g., a bee for "ee"), and displays spellings of sounds (e.g., "ee", "e_e", "i", "ea", "e", "y", "ey", "ie", "ei", i_e") that correspond to the selected spelling. Optionally, the various sounds may be automatically be enunciated in response to the user selecting the letter or in response to the user activating a sound control (e.g., a speaker icon).

FIGS. 5A-5G illustrates an example process (including several optional sub-processes) that utilizes finger touch detection and tracking. As similarly discussed above, the process may demonstrate how to decode a language by breaking the language down into components. The process may utilize interfaces that employ images and/or motion, and that are configured to receive, monitor, and respond to user touch. The process may provide audible information, such as sounds corresponding to a tones, songs, phonemes, letters, words, phrases, and/or sentences.

An initial sub-process of the process may optionally be performed via which a user may select a training process level and a related symbol (or combinations of symbols which may correspond to a basic language sound or phoneme). At block 500, the process displays on a touch device touch display a training process difficulty level user interface. For example, there may be two, three, four, or more training processes from which to select, where the lowest number training process may be the least challenging, and the highest number training process may be the most challenging. At block 502, the process receives a training process selection via the touch display. At block 504, the process displays symbol selection icons on the touch display. The symbols may be letters, such as letters from the English alphabet. At block 506, a user symbol selection is made via the touch display.

A symbol demonstration sub-process may optionally be performed as part of the process. At block 507, the process displays the selected symbol (e.g., the selected letter) and a symbol mnemonic graphic which may have a similar shape as the selected symbol. For example, if the symbol is a lower case "a" the symbol mnemonic graphic may be an apple. By way of further example, if the symbol is an uppercase "A" the symbol mnemonic graphic may be a top view of an alligator head. Optionally, sound files corresponding to the symbol are accessed from memory, and the application may play back the sound file via the touch device speaker while displaying the symbol (optionally in an enlarged font or by otherwise emphasizing the symbol). For example, if the symbol is an "a", the application may play the following: "ahh", a name of the symbol mnemonic graphic (e.g., "alligator"), and/or a phrase that combines the symbol sound with the name of the symbol mnemonic graphic (e.g., "ahh as in alligator"). At block 508, the user is instructed (e.g., via text, graphics, spoken word, or otherwise) to drag the symbol over the symbol mnemonic graphic. The user interaction with the touch display (and the displayed symbol) is monitored to determine if the user has touched the symbol with a finger, and if the user has dragged the symbol with the finger over the symbol mnemonic graphic (or vice versa).

Once the process determines that the user has dragged the symbol over the symbol mnemonic graphic (or within a certain threshold of being dragged over the symbol mnemonic as similarly discussed above with respect to FIG. 2C and with respect to vector comparison), the process proceeds to block 512, and optionally sound files corresponding to the symbol are accessed from memory. At block 514, the application optionally plays back the sound file via the touch device speaker while displaying the symbol (optionally in an enlarged font or by otherwise emphasizing the symbol).

At block 516, the process displays the symbol mnemonic graphic as displaced pieces (e.g., as puzzle pieces) and an outline of the symbol mnemonic graphic. For example, if the symbol mnemonic is an alligator, the pieces may include the basic alligator head as a first piece, the left teeth as a second piece, the right teeth as a third piece, and the eyes as a fourth piece. At block 518, the process monitors the user interaction with the touch display (and a displayed symbol mnemonic piece) to determine if the user has touched a displayed symbol mnemonic piece with a finger, and at block 520 determines whether the user has dragged the displayed symbol mnemonic piece to the appropriate location in the displayed symbol mnemonic outline. Once the process determines that the user has dragged the displayed symbol mnemonic piece to the appropriate location in the displayed symbol mnemonic outline (e.g., or within a threshold), the process may snap the displayed symbol mnemonic piece to the appropriate location, and the process may proceed to block 522. At block 522, the process determines whether there are remaining component pieces of the symbol mnemonic that still need to be placed at the appropriate location within the symbol mnemonic outline. If there are remaining component pieces of the symbol mnemonic that still need to be placed at the appropriate location within the symbol mnemonic outline, the process proceeds to block 518. Otherwise, the process proceeds to block 522.

At block 522, the symbol is displayed using a relatively larger font and is made draggable via touch. At block 524, the process monitors the user interaction with the touch display (and the displayed symbol) to determine if the user has touched the displayed symbol with a finger, and at block 526 determines whether the user has dragged the displayed symbol over the mnemonic graphic. If the process determines the user has not dragged the displayed symbol over the mnemonic graphic, the process proceeds to block 524. If the process that the user has dragged the displayed symbol over the mnemonic graphic, the process proceeds to block 528, and accesses and plays a sound file. The process play the sound file, which may include a digital song that includes the sound of the symbol (e.g., the sound of the letter) and the name of the mnemonic graphic ("the alligator sound says "aah, aah, aah"), and moves that symbol and mnemonic graphic towards each other until the symbol overlays the mnemonic graphic.

The following sub-process of the process relates to training the user how to write/draw the symbol by interacting with the touch display using a finger. At block 530, the process displays the symbol with tracing indicators overlaying the symbol mnemonic graphic. For example, the letter "A" may be formed using arrows as the tracing indicators, and the symbol mnemonic graphic may be an alligator head, as discussed above. At block 532, the process monitors the user interaction with the touch display (and the displayed symbol) to determine if the user has touched the displayed symbol at a correct starting point. For example, the process may indicate the correct starting point (e.g., the base of the arrow to be traced first) using a blinking dot, other icon, or otherwise. As the process detects the user moving the finger from the correct starting point down the arrow, the process may optionally cause a corresponding color trail to be rendered. Optionally, if the process detects the user is moving the finger from an incorrect starting point, the process may inhibit the rendering of such a color trail or may only display the color trail for a portion (e.g., less than half) of the incorrect tracing indicator being traced.

At block 534, the process determines if the user has traced the correct tracing indicator from the correct starting point, in the correct direction, to a minimum threshold distance (e.g., to the arrowhead). If the process determines that the user has not traced the correct tracing indicator from the correct starting point, in the correct direction, to the minimum threshold distance (e.g., to the arrowhead), optionally at block 537 the color trail is removed from the display to indicate that the user has not correctly performed the task.

At block 536, if the process determines that the user has traced the correct tracing indicator from the correct starting point, in the correct direction, to the minimum threshold distance, the process maintains the color trail to indicate that the user has correctly traced the symbol segment. At block 538, the process determines if there are additional tracing indicators remaining to be traced, and if so, the process returns to block 532. The foregoing states are repeated until the user correctly traces the trace indicators to thereby correctly write/draw the symbol.

The foregoing symbol drawing sub-process may then repeated. However, the symbol mnemonic graphic may be omitted to present the symbol in a more abstract manner. At block 542, the process displays the symbol with tracing indicators without the symbol mnemonic graphic. For example, the letter "A" may be formed using arrows as the tracing indicators. At block 544, the process monitors the user interaction with the touch display (and the displayed symbol) to determine if the user has touched the displayed symbol at a correct starting point. For example, the process may indicate the correct starting point (e.g., the base of the arrow to be traced first) using a blinking dot, other icon, or otherwise. As the process detects the user moving the finger from the correct starting point down the arrow, the process may optionally cause a corresponding color trail to be rendered. Optionally, if the process detects the user is moving the finger from an incorrect starting point, the process may inhibit the rendering of such a color trail or may only display the color trail for a portion (e.g., less than half) of the incorrect tracing indicator being traced.

At block 546, the process determines if the user has traced the correct tracing indicator from the correct starting point, in the correct direction, to a minimum threshold distance (e.g., to the arrowhead). If the process determines that the user has not traced the correct tracing indicator from the correct starting point, in the correct direction, to the minimum threshold distance (e.g., to the arrowhead), optionally the color trail is removed from the display at state 548 to indicate that the user has not correctly performed the task.

At block 550, if the process determines that the user has traced the correct tracing indicator from the correct starting point, in the correct direction, to the minimum threshold distance, the process maintains the color trail to indicate that the user has correctly traced the symbol segment. At block 552, the process determines if there are additional tracing indicators remaining to be traced, and if so, the process returns to block 544. The foregoing states are repeated until the user correctly traces the trace indicators to thereby correctly write/draw the symbol.

The foregoing symbol drawing process may then repeated. However, the tracing indicators may be omitted to present the symbol in a more abstract manner and without arrows to aid the user. At block 554, the process displays the symbol (e.g., as an outline) without tracing indicators and without the symbol mnemonic graphic. At block 556, the process monitors the user interaction with the touch display (and the displayed symbol) to determine if the user has touched the displayed symbol at a correct starting point. For example, the process may indicate the correct starting point (e.g., an end of a symbol segment to be traced first) using a blinking dot, other icon, or otherwise. As the process detects the user moving the finger from the correct starting point down the symbol segment, the process may optionally cause a corresponding color trail to be rendered. Optionally, if the process detects the user is moving the finger from an incorrect starting point, the process may inhibit the rendering of such a color trail or may only display the color trail for a portion (e.g., less than half) of the incorrect segment being traced.

At block 558, the process determines if the user has traced the correct symbol segment from the correct starting point, in the correct direction, to a minimum threshold distance (e.g., to the bottom of the correct symbol segment). If the process determines that the user has not traced the correct tracing indicator from the correct starting point, in the correct direction, to the minimum threshold distance (e.g., to the end of the symbol segment), optionally the color trail is removed from the display at state 560 to indicate that the user has not correctly performed the task.

At block 562, if the process determines that the user has traced the correct symbol segment from the correct starting point, in the correct direction, to the minimum threshold distance, the process maintains the color trail to indicate that the user has correctly traced the symbol segment. At block 564, the process determines if there are additional symbol segment remaining to be traced, and if so, the process returns to block 556. The foregoing states are repeated until the user correctly traces the symbol segments to thereby correctly write/draw the symbol.

A symbol reinforcement sub-process may optionally be performed relating to distinguishing between different versions of a symbol. At block 570 multiple versions of the symbol may be displayed (e.g., an uppercase "A" and a lowercase "a"). Underneath a given symbol version a corresponding target (e.g., a geometric shape, such as a circle) may be displayed. Underneath a given target a symbol mnemonic graphic may be displayed. For example, an alligator head (corresponding to the uppercase "A") and an apple (corresponding to the lowercase "a") may be displayed. The symbol mnemonic graphic may be displayed underneath the target for the corresponding symbol version, or the symbol mnemonic graphic may be displayed underneath the target for the non-corresponding symbol version. For example, the alligator head may be displayed underneath the target for the lowercase "a" and the apple may be displayed underneath the target for the uppercase "A".

At block 572, the process the user interaction with the touch display (and a displayed symbol mnemonic graphic) is monitored to determine if the user has touched/selected a displayed symbol mnemonic graphic with a finger. A block 574 a determination is made as to whether the user has dragged the mnemonic symbol over the target area corresponding to the matching symbol version. If the process determines that the user has dragged the mnemonic symbol over the target area corresponding to the matching symbol version (e.g., so that the center of the mnemonic symbol is within a threshold distance of the target center), the process snaps the symbol mnemonic graphic to the target area and optionally generates an audible confirmation sound via the touch device speaker. At block 578, a determination is made as to whether there are additional symbol mnemonic graphics remaining that need to be dragged to corresponding targets. If a determination is made that there are additional symbol mnemonic graphics remaining that need to be dragged to corresponding targets, the process proceeds back to block 572.

If a determination is made that there are no additional symbol mnemonic graphics remaining that need to be dragged to corresponding targets, the process proceeds back to block 580, where a keyboard sub-process of the process is performed. At block 580, the process displays an electronic keyboard and generates a sound corresponding to the symbol (e.g., "aah" for "a"). The keyboard keys may be blank, except for that of the key corresponding to the symbol being taught (e.g., "a") and a key corresponding to one other symbol (although optionally more keys may display additional symbols). At block 582, the process monitors the touch display for a user input. At block 584, the process determines that the user has touched a keyboard key and further determines whether the user has selected the keyboard key corresponding to the symbol being taught (e.g., "a").

If a determination is that the user touched an incorrect symbol letter key, optionally the process proceeds to block 586, displays the corresponding symbol in the symbol field in a greyed out fashion (or other indicator may be provided indicating the incorrect key selection), and provides a visual failure feedback indicator (e.g., an "X") and/or audible failure indicator.

If the process determines that the user has touched the correct key, the process proceeds to block 588, and optionally causes the symbol to be displayed in a symbol field and provides a visual confirmation feedback indicator (e.g., a checkmark and/or electronic card with the symbol) and/or an audible confirmation indicator. In addition, an electronic card may be displayed that includes the letter. The process then optionally proceeds to block us.

At block 590, the process displays a user interface that displays the symbol (e.g., "a"), a target field, and a plurality of sound controls (e.g., speaker icons of different colors). Activation of a given sound control causes the touch device to emit a sound, one of which corresponds to the symbol. At block 592, the process monitors the touch display for a user input. At block 592, the process determines that the user has touched a sound control and dragged the sound control to a sound control field. At block 594, the process determines whether the sound control that the user dragged to the sound control field. At least partly in response to detecting that the user has dragged the corrected sound control to the target field, at block 596, the process provides a visual confirmation feedback indicator (e.g., a checkmark) and/or an audible confirmation indicator.

The process may also enable drawings and/or user inputs from the user to be aggregated and stored as a file (e.g., a gallery file). Access to the file may be provided to one or more other users (e.g., a trainer, a parent, etc.). In addition, each success and/or failure of a user to perform a task may be reported via a user interface to one or more other users. Optionally, one or more scores may be generated based on a user's performance and the score may be provided to one or more other users. Thus, another person, such as a parent may be provided access, via the app installed on a device of the person or a via webpage accessed from a website that receives uploads from the user device, may access and view the user's performance and drawings.

Thus, described herein, among other features, are example touch devices and methods for detecting and tracking finger and other gestures using a touch device.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone application, computer application, a short messaging service message (e.g., SMS, MMS, etc.), instant messaging, email, push notification, audibly, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A portable electronic device having a touch user interface, the portable electronic device comprising:
    a touch display configured to sense contact with a finger or stylus and to display visual content;
    a speaker;
    a processing system comprising at least one computing device, the processing system configured to communicate with the touch display and the speaker; and
    non-transitory memory that stores instructions that when executed by the processing system cause the portable electronic device to perform operations comprising:
        display a first iteration of a first symbol, wherein the first iteration of the first symbol is displayed without trace indicator line segments;
        generate a sound corresponding to the first symbol using the speaker;
        display a second iteration of the first symbol using a set of trace indicator line segments comprising a trace direction indicator and a trace termination indicator;
        highlight an end region of a first of the trace indicator line segments of the second iteration of the first symbol;
        detect user touch input at a plurality of locations on the touch display while second iteration of the first symbol is displayed;
        based at least in part on the detected user touch input at the plurality of locations while second iteration of the first symbol is displayed, determine whether the user has traced the first trace indicator line segment of the second iteration of the first symbol from the highlighted end region to the termination indicator in a direction corresponding to the trace direction indicator;
        draw and maintain a color line corresponding to the detected user touch input at the plurality of locations while second iteration of the first symbol is displayed at least partly in response to a determination that the user has traced, with respect to the second iteration of the first symbol, the first trace indicator line segment from the highlighted end region to the termination indicator in a direction corresponding to the trace direction indicator;
        display a third iteration of the first symbol using the set of trace indicator line segments comprising the trace direction indicator and the trace termination indicator, wherein the first symbol overlays a symbol mnemonic graphic having a shape corresponding to that of the first symbol;
        highlight an end region of the first of the trace indicator line segments of the third iteration of the first symbol while the third iteration of the first symbol overlays the symbol mnemonic graphic;
        detect user touch input at two or more locations on the touch display while the third iteration of the first symbol overlays the symbol mnemonic graphic;
        based at least in part on the detected user touch input at the two or more locations while the third iteration of the first symbol overlays the symbol mnemonic graphic, determine whether the user has traced the first trace indicator line segment of the third iteration of the first symbol from the highlighted end region to the termination indicator in a direction corresponding to the trace direction indicator;
        maintain a color line corresponding to the detected user touch input at the two or more locations while the third iteration of the first symbol overlays the symbol mnemonic graphic at least partly in response to a determination that the user has traced the first trace indicator line segment from the highlighted end region to the termination indicator in a direction corresponding to the trace direction indicator.

2. The portable electronic device having a touch user interface, as defined in claim 1, wherein the determination as to whether the user has traced the first trace indicator line segment of the second iteration of the first symbol from the highlighted end region to the termination indicator in a direction corresponding to the trace direction indicator comprises:
    a comparison of a vector corresponding to the detected user touch input at the plurality of locations to a reference vector.

3. The portable electronic device having a touch user interface, as defined in claim 1, the portable electronic device further comprising:
    an accelerometer,
    a 3-axis gyroscope,
    a temperature sensor, and
    a camera
    a speaker.

4. The portable electronic device having a touch user interface, as defined in claim 1, wherein the operations further comprise:
    display a fourth iteration of the first symbol using a set of segments, wherein display of a given segment in the set of segments does not include display of the trace direction indicators;
    highlight a first end of the first of the segments of the fourth iteration of the first symbol;
    detect user touch input at two or more locations on the touch display while the fourth iteration of the first symbol is displayed using the set of segments;
    based at least in part on the detected user touch input at the two or more locations while the fourth iteration of the first symbol is displayed using the set of segments, determine whether the user has traced the first segment from the highlighted first end to a termination location in the direction corresponding the trace direction indicator of the second iteration of the first symbol;

maintain a color line corresponding to the detected user touch input at the two or more locations while the fourth iteration of the first symbol is displayed using the set of segments at least partly in response to a determination that the user has traced the first segment from the highlighted end to the termination area in the direction corresponding to the trace direction indicator.

5. The portable electronic device having a touch user interface, as defined in claim 1, wherein the operations further comprise:

provide a symbol selection user interface comprising a plurality of symbols via the touch display;

receive a user symbol selection via the touch display;

display via the touch display the selected symbol in conjunction with a symbol mnemonic graphic;

monitor user interaction with the touch display at least while the selected symbol is displayed in conjunction with the symbol mnemonic graphic;

determined whether the user has dragged the symbol mnemonic graphic to overlay the selected symbol at least a first threshold amount;

at least partly in response to a determination that the user has dragged the symbol mnemonic graphic to overlay the selected symbol at least a first threshold amount, generate a sound, using the speaker, corresponding to a sound associated with the symbol.

6. The portable electronic device having a touch user interface, as defined in claim 1, wherein the operations further comprise:

provide a symbol selection user interface;

receive a user symbol selection via the touch display;

display via the touch display the selected symbol in conjunction with a symbol mnemonic graphic;

display via the touch display the symbol mnemonic graphic as a plurality of displaced components;

display via the touch display an outline corresponding to the symbol mnemonic graphic;

monitor interaction of a user touch input with the symbol mnemonic graphic components;

determine whether the user has moved, via a user touch input, each of the symbol mnemonic graphic components into the assembled outline corresponding to the symbol mnemonic graphic to form an assembled symbol mnemonic graphic;

at least partly in response to a determination that the user has moved, via a user a touch input, each of the symbol mnemonic graphic components into the assembled outline corresponding to the symbol mnemonic graphic to form an assembled symbol mnemonic graphic, enable the user to move, via a touch input, the symbol over the assembled symbol mnemonic graphic;

determine whether the user has moved the symbol to over lay the assembled symbol mnemonic graphic;

at least partly in response to a determination that the user has moved the symbol to over lay the assembled symbol mnemonic graphic, play a sound file that includes a sound that corresponds to the symbol and a word that corresponds to the symbol mnemonic graphic.

7. The portable electronic device having a touch user interface, as defined in claim 1, wherein the operations further comprise:

display via the touch display a first version of the first symbol;

display via the touch display a second version of the first symbol;

display a first target in association with the first version of the first symbol;

display a second target in association with the second version of the first symbol;

display a first symbol mnemonic graphic whose shape corresponds to the first version of the first symbol;

display a second symbol mnemonic graphic whose shape corresponds to the second version of the first symbol;

determine if the user has moved, via touch input, the first symbol to overlay the first target;

determine if the user has moved, via touch input, the second symbol to overlay the second target;

at least partly in response to a determination that the user has moved, via touch input, the first symbol to overlay the first target and the second symbol to overlay the second target, generate a confirmation sound.

8. The portable electronic device having a touch user interface, as defined in claim 1, wherein the operations further comprise:

display a keyboard via the touch display, including a first key that displays the first symbol, a second key the displays a second symbol, and a plurality of keyboard keys that do not display symbols;

determine if the user has touched the first key;

at least partly in response to detecting that the user has touched the first key, display the first symbol in a symbol field and generate a sound corresponding to the first symbol.

9. A method for processing touch inputs received via a touch device, the method comprising:

displaying via a touch display of the touch device a first iteration of a first symbol, wherein the first iteration of the first symbol is displayed without trace indicator line segments;

generating a sound corresponding to the first symbol;

displaying via the touch display of the touch device a second iteration of the first symbol using a set of trace indicator line segments comprising a trace direction indicator and a trace termination indicator;

highlighting via the touch display of the touch device a first region of a first of the trace indicator line segments of the second iteration of the first symbol;

detecting user touch input at a plurality of locations on the touch display while the second iteration of the first symbol is displayed;

based at least in part on the detected user touch input at the plurality of locations while second iteration of the first symbol is displayed, determining whether the user has traced the first trace indicator line segment of the second iteration of the first symbol from the highlighted region to the termination indicator in a direction corresponding to the trace direction indicator; and drawing and maintaining a color line corresponding to the detected user touch input at the plurality of locations while second iteration of the first symbol is displayed at least partly in response to a determination that the user has traced the first trace indicator line segment of the second iteration of the first symbol from the highlighted first region to the termination indicator in a direction corresponding to the trace direction indicator;

displaying a third iteration of the first symbol using the set of trace indicator line segments comprising the trace direction indicator and the trace termination indicator, wherein the first symbol overlays a symbol mnemonic graphic having a shape corresponding to that of the first symbol;

highlighting a region of the first of the trace indicator line segments of the third iteration of the first symbol while the third iteration of the first symbol overlays the symbol mnemonic graphic;

detecting user touch input at two or more locations on the touch display while the third iteration of the first symbol overlays the symbol mnemonic graphic;

based at least in part on the detected user touch input at the two or more locations while the third iteration of the first symbol overlays the symbol mnemonic graphic, determining whether the user has traced the first trace indicator line segment of the third iteration of the first symbol from the highlighted region to the termination indicator in a direction corresponding to the trace direction indicator;

maintaining a color line corresponding to the detected user touch input at the two or more locations while the third iteration of the first symbol overlays the symbol mnemonic graphic at least partly in response to a determination that the user has traced the first trace indicator line segment from the highlighted region to the termination indicator in a direction corresponding to the trace direction indicator.

10. The method as defined in claim 9, wherein determining whether the user has traced the first trace indicator line segment of the second iteration of the first symbol from the highlighted first region to the termination indicator in a direction corresponding to the trace direction indicator comprises:

a comparison of a vector corresponding to the detected user touch input at the plurality of locations to a reference vector.

11. The method as defined in claim 9, the method further comprising:

displaying a fourth iteration of the first symbol using a set of segments, wherein display of a given segment in the set of segments does not include display of the trace direction indicators;

highlighting a region of the first of the segments of the fourth iteration of the first symbol;

detecting user touch input at two or more locations on the touch display while the fourth iteration of the first symbol is displayed using the set of segments;

based at least in part on the detected user touch input at the two or more locations while the fourth iteration of the first symbol is displayed using the set of segments, determine whether the user has traced the first segment from the highlighted region to a termination location in the direction corresponding to the trace direction indicator of the second iteration of the first symbol;

maintaining a color line corresponding to the detected user touch input at the two or more locations while the fourth iteration of the first symbol is displayed using the set of segments at least partly in response to a determination that the user has traced the first segment from the highlighted region to the termination area in the direction corresponding to the trace direction indicator.

12. The method as defined in claim 9, the method further comprising:

providing a symbol selection user interface comprising a plurality of symbols via the touch display;

receiving a user symbol selection via the touch display;

displaying via the touch display the selected symbol in conjunction with a symbol mnemonic graphic;

monitoring user interaction with the touch display at least while the selected symbol is displayed in conjunction with the symbol mnemonic graphic;

determining whether the user has dragged the symbol mnemonic graphic to overlay the selected symbol at least a first threshold amount;

at least partly in response to a determination that the user has dragged the symbol mnemonic graphic to overlay the selected symbol at least a first threshold amount, generating a sound corresponding to a sound associated with the symbol.

13. The method as defined in claim 9, the method further comprising:

providing a symbol selection user interface;

receiving a user symbol selection via the touch display;

displaying via the touch display the selected symbol in conjunction with a symbol mnemonic graphic;

displaying via the touch display the symbol mnemonic graphic as a plurality of displaced components;

displaying via the touch display an outline corresponding to the symbol mnemonic graphic;

monitoring interaction of a user touch input with the symbol mnemonic graphic components;

determining whether the user has moved, via a user touch input, each of the symbol mnemonic graphic components into the assembled outline corresponding to the symbol mnemonic graphic to form an assembled symbol mnemonic graphic;

at least partly in response to a determination that the user has moved, via a user a touch input, each of the symbol mnemonic graphic components into the assembled outline corresponding to the symbol mnemonic graphic to form an assembled symbol mnemonic graphic, enabling the user to move, via a touch input, the symbol over the assembled symbol mnemonic graphic;

determining whether the user has moved the symbol to over lay the assembled symbol mnemonic graphic;

at least partly in response to determining that the user has moved the symbol to over lay the assembled symbol mnemonic graphic, play a sound file that includes a sound that corresponds to the symbol and a word that corresponds to the symbol mnemonic graphic.

14. The method as defined in claim 9, the method further comprising:

displaying via the touch display a first version of the first symbol;

displaying via the touch display a second version of the first symbol;

displaying a first target in association with the first version of the first symbol;

displaying a second target in association with the second version of the first symbol;

displaying a first symbol mnemonic graphic whose shape corresponds to the first version of the first symbol;

displaying a second symbol mnemonic graphic whose shape corresponds to the second version of the first symbol;

determining if the user has moved, via touch input, the first symbol to overlay the first target;

determining if the user has moved, via touch input, the second symbol to overlay the second target;

at least partly in response to determining that the user has moved, via touch input, the first symbol to overlay the first target and the second symbol to overlay the second target, generating a confirmation sound.

15. The method as defined in claim 9, the method further comprising:

displaying a keyboard via the touch display, including a first key that displays the first symbol, a second key the displays a second symbol, and a plurality of keyboard keys that do not display symbols;

determining if the user has touched the first key;

at least partly in response to detecting that the user has touched the first key, displaying the first symbol in a symbol field and generate a sound corresponding to the first symbol.

16. Non-transitory memory that stores instructions that when executed by a computing system cause the computing to perform operations comprising:

display a first iteration of a first symbol, wherein the first iteration of the first symbol is displayed without trace indicator line segments;

generate a sound corresponding to the first symbol;

display a second iteration of the first symbol using a set of trace indicator line segments comprising a trace direction indicator and a trace termination indicator;

highlight an first region of a first of the trace indicator line segments of the second iteration of the first symbol;

detect user touch input at a plurality of locations on the touch display while second iteration of the first symbol is displayed;

based at least in part on the detected user touch input at the plurality of locations while second iteration of the first symbol is displayed, determine whether the user has traced the first trace indicator line segment of the second iteration of the first symbol from the highlighted first region to the termination indicator in a direction corresponding to the trace direction indicator; and draw and maintain a color line corresponding to the detected user touch input at the plurality of locations while second iteration of the first symbol is displayed at least partly in response to a determination that the user has traced, with respect to the second iteration of the first symbol, the first trace indicator line segment from the highlighted first region to the termination indicator in a direction corresponding to the trace direction indicator;

display a third iteration of the first symbol using the set of trace indicator line segments comprising the trace direction indicator and the trace termination indicator, wherein the first symbol overlays a symbol mnemonic graphic having a shape corresponding to that of the first symbol;

highlight a region of the first of the trace indicator line segments of the third iteration of the first symbol while the third iteration of the first symbol overlays the symbol mnemonic graphic;

detect user touch input at two or more locations on the touch display while the third iteration of the first symbol overlays the symbol mnemonic graphic;

based at least in part on the detected user touch input at the two or more locations while the third iteration of the first symbol overlays the symbol mnemonic graphic, determine whether the user has traced the first trace indicator line segment of the third iteration of the first symbol from the highlighted region to the termination indicator in a direction corresponding to the trace direction indicator;

maintain a color line corresponding to the detected user touch input at the two or more locations while the third iteration of the first symbol overlays the symbol mnemonic graphic at least partly in response to a determination that the user has traced the first trace indicator line segment from the highlighted region to the termination indicator in a direction corresponding to the trace direction indicator.

17. The non-transitory memory as defined in claim 16, wherein the determination as to whether the user has traced the first trace indicator line segment of the second iteration of the first symbol from the highlighted first region to the termination indicator in a direction corresponding to the trace direction indicator comprises:

a comparison of a vector corresponding to the detected user touch input at the plurality of locations to a reference vector.

18. The non-transitory memory as defined in claim 16, wherein the instructions are further configured to cause the computing to perform operations comprising:

display a fourth iteration of the first symbol using a set of segments, wherein display of a given segment in the set of segments does not include display of the trace direction indicators;

highlight a region of the first of the segments of the fourth iteration of the first symbol;

detect user touch input at two or more locations on the touch display while the fourth iteration of the first symbol is displayed using the set of segments;

based at least in part on the detected user touch input at the two or more locations while the fourth iteration of the first symbol is displayed using the set of segments, determine whether the user has traced the first segment from the highlighted region to a termination location in the direction corresponding to the trace direction indicator of the second iteration of the first symbol;

maintain a color line corresponding to the detected user touch input at the two or more locations while the fourth iteration of the first symbol is displayed using the set of segments at least partly in response to a determination that the user has traced the first segment from the highlighted region to the termination area in the direction corresponding to the trace direction indicator.

19. The non-transitory memory as defined in claim 16, wherein the instructions are further configured to cause the computing to perform operations comprising:

provide a symbol selection user interface comprising a plurality of symbols via the touch display;

receive a user symbol selection via the touch display;

display via the touch display the selected symbol in conjunction with a symbol mnemonic graphic;

monitor user interaction with the touch display at least while the selected symbol is displayed in conjunction with the symbol mnemonic graphic;

determined whether the user has dragged the symbol mnemonic graphic to overlay the selected symbol at least a first threshold amount;

at least partly in response to a determination that the user has dragged the symbol mnemonic graphic to overlay the selected symbol at least a first threshold amount, generate a sound corresponding to a sound associated with the symbol.

20. The non-transitory memory as defined in claim 16, wherein the instructions are further configured to cause the computing to perform operations comprising:

provide a symbol selection user interface;

receive a user symbol selection via the touch display;

display via the touch display the selected symbol in conjunction with a symbol mnemonic graphic;

display via the touch display the symbol mnemonic graphic as a plurality of displaced components;

display via the touch display an outline corresponding to the symbol mnemonic graphic;

monitor interaction of a user touch input with the symbol mnemonic graphic components;

determine whether the user has moved, via a user touch input, each of the symbol mnemonic graphic components into the assembled outline corresponding to the symbol mnemonic graphic to form an assembled symbol mnemonic graphic;

at least partly in response to a determination that the user has moved, via a user a touch input, each of the symbol mnemonic graphic components into the assembled outline corresponding to the symbol mnemonic graphic to form an assembled symbol mnemonic graphic, enable the user to move, via a touch input, the symbol over the assembled symbol mnemonic graphic;

determine whether the user has moved the symbol to over lay the assembled symbol mnemonic graphic;

at least partly in response to a determination that the user has moved the symbol to over lay the assembled symbol mnemonic graphic, play a sound file that includes a sound that corresponds to the symbol and a word that corresponds to the symbol mnemonic graphic.

21. The non-transitory memory as defined in claim 16, wherein the instructions are further configured to cause the computing to perform operations comprising:

display via the touch display a first version of the first symbol;

display via the touch display a second version of the first symbol;

display a first target in association with the first version of the first symbol;

display a second target in association with the second version of the first symbol;

display a first symbol mnemonic graphic whose shape corresponds to the first version of the first symbol;

display a second symbol mnemonic graphic whose shape corresponds to the second version of the first symbol;

determine if the user has moved, via touch input, the first symbol to overlay the first target;

determine if the user has moved, via touch input, the second symbol to overlay the second target;

at least partly in response to a determination that the user has moved, via touch input, the first symbol to overlay the first target and the second symbol to overlay the second target, generate a confirmation sound.

22. The non-transitory memory as defined in claim 16, wherein the instructions are further configured to cause the computing to perform operations comprising:

display a keyboard via the touch display, including a first key that displays the first symbol, a second key the displays a second symbol, and a plurality of keyboard keys that do not display symbols;

determine if the user has touched the first key;

at least partly in response to detecting that the user has touched the first key, display the first symbol in a symbol field and generate a sound corresponding to the first symbol.

* * * * *

UNITED STATES PATENT AND TRADEMARK OFFICE
CERTIFICATE OF CORRECTION

| | | |
|---|---|---|
| PATENT NO. | : 9,996,255 B2 | Page 1 of 1 |
| APPLICATION NO. | : 15/048782 | |
| DATED | : June 12, 2018 | |
| INVENTOR(S) | : Eyal Rav-Noy | |

It is certified that error appears in the above-identified patent and that said Letters Patent is hereby corrected as shown below:

On the Title Page

Item (71), Applicant, Line 1: After "Learning" insert --Los Angeles, CA (US)--.

In the Drawings

On Sheet 37 of 38, (Reference Numeral 580), (FIG 5F), Line 3: Change "SYBMOL" to --SYMBOL--.

In the Specification

On Column 5, Line 66: Change "lbs/inch" to --lbs/inch2--.

In the Claims

On Column 26, Line 22: In Claim 8, change "key the" to --key that--.

On Column 29, Line 2: In Claim 15, change "key the" to --key that--.

On Column 29, Line 25: In Claim 16, after "displayed" insert --;--.

On Column 32, Line 22: In Claim 22, change "key the" to --key that--.

Signed and Sealed this
Eighteenth Day of September, 2018

Andrei Iancu
*Director of the United States Patent and Trademark Office*